(12) United States Patent
Johal et al.

(10) Patent No.: US 11,082,310 B2
(45) Date of Patent: *Aug. 3, 2021

(54) INDICATOR VALUE AGGREGATION IN A MULTI-INSTANCE COMPUTING ENVIRONMENT

(71) Applicant: ServiceNow, Inc., Santa Clara, CA (US)

(72) Inventors: Amanjit Singh Johal, Foster City, CA (US); Mohammed Abdul Farhan Khan, Santa Clara, CA (US); Manjeet Singh, Milpitas, CA (US)

(73) Assignee: ServiceNow, Inc., Santa Clara, CA (US)

(*) Notice: Subject to any disclaimer, the term of this patent is extended or adjusted under 35 U.S.C. 154(b) by 42 days.

This patent is subject to a terminal disclaimer.

(21) Appl. No.: 16/552,423

(22) Filed: Aug. 27, 2019

(65) Prior Publication Data

US 2020/0059423 A1 Feb. 20, 2020

Related U.S. Application Data

(63) Continuation of application No. 15/588,078, filed on May 5, 2017, now Pat. No. 10,419,304.

(51) Int. Cl.
*H04L 12/26* (2006.01)
*H04L 12/24* (2006.01)
*H04L 29/08* (2006.01)

(52) U.S. Cl.
CPC ........ *H04L 43/028* (2013.01); *H04L 41/5009* (2013.01); *H04L 41/5067* (2013.01);
(Continued)

(58) Field of Classification Search
CPC . H04L 41/22; H04L 41/5009; H04L 41/5067; H04L 43/028; H04L 43/04;
(Continued)

(56) References Cited

U.S. PATENT DOCUMENTS 6,609,122 B1 8/2003 Ensor
6,700,590 B1* 3/2004 DeMesa ............... G06Q 30/02
715/744

(Continued)

OTHER PUBLICATIONS zendesk.com, Jessica Marasco, "Overview of the Insights pre-built dashboard (Professional and Enterprise)", Zendesk Support, Administrators, Reporting and Performance, https://support.zendesk.com/hc/en-us/articles/206146718-0verview-of-the-I nsights-pre-built-dashboard-Professional-and-Enterprise-, Created Jul. 8, 2015, updated Feb. 9, 2017, Downloaded Feb. 17, 2017, 20 pp.

(Continued)

*Primary Examiner* — Alina A Boutah
(74) *Attorney, Agent, or Firm* — Fletcher Yoder, P.C.

(57) ABSTRACT

Indicator values are anonymously aggregated in a multi-instance computing environment. Aggregations of indicator values are received from customer instances in a multi-instance computing environment. At least one of the aggregations of indicator values is generated by a respective customer instance of the customer instances based on indicator values generated by the respective customer instance. The aggregations of indicator values are filtered to produce filtered aggregations, and the filtered aggregations are aggregated according to characteristics associated with at least some of the customer instances to generate global indicator values. Each global indicator value is generated from one or more of the filtered aggregations that are greater than a minimum threshold. One or more of the global indicator values may then be transmitted to a customer instance of the customer instances having a characteristic corresponding to those global indicator values.

20 Claims, 21 Drawing Sheets

| | DESCRIPTION | YOUR STANDING | GLOBAL BENCHMARK |
|---|---|---|---|
| 1210 | % of High Priority Incidents | 45% | 36% |
| 1212 | Average Time to Close a High Priority Incident | 2 Days | 3 days |
| 1214 | Average Time to Close an Incident | 1 Days | 2 days |
| 1216 | % of Incidents Closed on First Assignment | 78% | 68% |
| | Average Time to Fulfill a Request | 3 Days | 4 days |

(52) U.S. Cl.
CPC .............. *H04L 41/22* (2013.01); *H04L 67/16* (2013.01); *H04L 67/306* (2013.01)

(58) Field of Classification Search
CPC ....... H04L 67/16; H04L 67/306; G06Q 10/06; G06Q 30/02; Y04S 10/54
See application file for complete search history.

(56) References Cited

U.S. PATENT DOCUMENTS

| | | | |
|---|---|---|---|
| 6,816,898 B1 | 11/2004 | Scarpelli | |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,610,512 B2 | 10/2009 | Gerber | |
| 7,617,073 B2 | 11/2009 | Trinon | |
| 7,689,628 B2 | 3/2010 | Garg | |
| 7,783,744 B2 | 8/2010 | Garg | |
| 7,890,802 B2 | 2/2011 | Gerber | |
| 7,930,396 B2 | 4/2011 | Trinon | |
| 7,945,860 B2 | 5/2011 | Vambenepe | |
| 7,966,398 B2 | 6/2011 | Wiles | |
| 8,051,164 B2 | 11/2011 | Peuter | |
| 8,224,683 B2 | 7/2012 | Manos | |
| 8,266,096 B2 | 9/2012 | Navarrete | |
| 8,457,928 B2 | 6/2013 | Dang | |
| 8,478,569 B2 | 7/2013 | Scarpelli | |
| 8,674,992 B2 | 3/2014 | Poston | |
| 8,689,241 B2 | 4/2014 | Naik | |
| 8,743,121 B2 | 6/2014 | De Peuter | |
| 8,887,133 B2 | 11/2014 | Behnia | |
| 9,239,857 B2 | 1/2016 | Trinon | |
| 9,535,737 B2 | 1/2017 | Joy | |
| 9,792,387 B2 | 10/2017 | George | |
| 9,819,729 B2 | 11/2017 | Moon | |
| 10,430,478 B1* | 10/2019 | Blalock | G06F 16/9566 |
| 10,459,827 B1* | 10/2019 | Aghdaie | A63F 13/67 |
| 2004/0117393 A1* | 6/2004 | DeMesa | G06Q 30/02 |
| 2006/0287998 A1* | 12/2006 | Folting | G06F 16/24556 |
| 2013/0179443 A1* | 7/2013 | Noel | G06F 40/18 707/736 |
| 2015/0193719 A1* | 7/2015 | Than | G06Q 10/105 705/7.39 |
| 2016/0170821 A1* | 6/2016 | Shiralkar | G06F 11/0751 714/37 |
| 2017/0083386 A1* | 3/2017 | Wing | G06Q 10/10 |
| 2017/0270099 A1* | 9/2017 | Gorny | G06Q 30/01 |
| 2017/0372337 A1* | 12/2017 | Han | G06Q 30/0202 |
| 2018/0039700 A1* | 2/2018 | Greenberger | G06K 9/18 |

OTHER PUBLICATIONS zendesk.com, Jessica Marasco, "About the Zendesk Benchmark and how to opt-in", Zendesk Support, Administrators, Reporting and Performance, Date Unknown, Downloaded Apr. 14, 2017, https://support.zendesk.com/hc/en-us/articles/207729238-About-the-Zendesk-Benchmark-and-how-to-opt-in, 4 pp.

servicenow.com, "Predefined formula indicators", Helsinki, Performance Analytics and Reporting, Date Unknown, Downloaded Apr. 14, 2017, https://docs.servicenow.com/bundle/helsinki-performance-analytics-and-reporting/page/Duse/performance-analytics/reference/r_FormulaIndicators.html, 3 pp.

servicenow.com, "Create an indicator and related records", Helsinki, Performance Analytics and Reporting, Date Unknown, Downloaded Apr. 14, 2017, https://docs.servicenow.com/bundle/helsinki-performance-analytics-and- Dreporting/page/use/performance-analytics/task/t_CrtIndctrIndctrWzrd.html, 6 pp.

servicenow.com, "Browsing and searching scorecards", Helsinki, Performance Analytics and Reporting, Date Unknown, Downloaded Apr. 14, 2017, https://docs.servicenow.com/bundle/helsinki-performance-analytics-and- Dreporting/page/use/performance-analytics/concept/c_UseIndicatorOverview.html, 3 pp.

servicenow.com, "Schedule a data collection job", Helsinki, Performance Analytics and Reporting, Date Unknown, Downloaded Apr. 14, 2017, https://docs.servicenow.com/bundle/helsinki-performance-analytics-and-reporting/page/use/performance-analytics/task/t_CreatASchedDataCollJob.html, 5 pp.

* cited by examiner

1100

FIRST LAYER OF AGGREGATION

| ID | AGG TYPE | DESCRIPTION | INTERVAL |
|---|---|---|---|
| IND001 | COUNT | TOTAL INCIDENTS OPENED | DAILY |
| IND002 | COUNT | HIGH PRIORITY INCIDENTS OPENED | DAILY |
| IND003 | COUNT | TOTAL INCIDENTS RESOLVED | DAILY |
| IND004 | AVERAGE | TIME TO RESOLVE INCIDENTS | DAILY |

1102, 1104, 1106, 1108

1110

SECOND LAYER OF AGGREGATION

| ID | AGG TYPE | DESCRIPTION | INTERVAL |
|---|---|---|---|
| IND005 | PERCENT | HIGH PRIORITY INCIDENTS | MONTHLY |
| IND006 | AVERAGE | INCIDENTS RESOLVED DAILY | MONTHLY |
| IND007 | AVERAGE | TIME TO RESOLVE HIGH PRI INCS | MONTHLY |
| IND008 | PERCENT | INCS OPEN MORE THAN ONE DAY | MONTHLY |

| | | |
|---|---|---|
| Application | Benchmark Central | —1602 |
| User name | svc_csi_benchmarking | —1604 |
| Password | ******** | —1606 |
| Server | | —1608 |
| Query | Specific SQL ▲▼ | —1610 |
| Query timeout | 0 | —1612 |
| Connection timeout | 0 | —1614 |
| Database statement | SELECT<br>YEAR("DATE"),<br>MONTH("DATE"),<br>"U_INSTANCE_NAME","PRIORITY_TYPE",<br>SUM( CAST("MTTR" AS BIGINT)) AS MTTR,<br>SUM( CAST("INTS_COUNT" AS BIGINT)) as INTS_COUNTS,<br>SUM( CAST("INTS_NOT_REASSIGNED_COUNT" AS BIGINT) ) as INTS_NOT_REASSIGNED_COUNT<br>FROM "PRODUCT_OPS"."DC_AUDIT_INTS_KPI"<br>WHERE MTTR <> 'NaN'<br>AND DATE > ADD_MONTHS(CURRENT_DATE,-6)<br>GROUP BY<br>YEAR("DATE"),MONTH("DATE"),MONTHNAME("DATE")<br>[['-']]YEAR("DATE"),"U_INSTANCE_NAME"<br>,"PRIORITY_TYPE"<br>ORDER BY 1,2 DESC | —1616 |
| Use last run datetime | ☐ —1618 | |
| Connection URL | jdbc:sap://sjc4apbihebp01.corp.service-now.com:30115 | —1620 |

FIG. 16

| | Benchmark Indicators | New | Go to | Name ▽ | Search ▽ | | ◀◀ ◀ [1] to 13 of 13 ▶ ▶▶ |
|---|---|---|---|---|---|---|---|

| ⚙ | 🔍 | ≡ Name △ | ≡ Active | ≡ Aggregation | Generate ≡ Global Scores | Benchmark:Percentage of high priority...overall incidents resolved |
|---|---|---|---|---|---|---|
| ☐ | ⓘ | Percentage of High Priority incidents o... | true | By month AVG | true | Benchmark: Percentage of high priority... |
| ☐ | ⓘ | Average time to close a requested item | true | By month AVG | true | Benchmark: Average time to close a request... |
| ☐ | ⓘ | Average time to resolve an incident | true | By month AVG | true | Benchmark: Average time to resolve an in... |
| ☐ | ⓘ | Average time to resolve high priority in... | true | By month AVG | true | Benchmark: Average time to resolve high... |
| ☐ | ⓘ | Number of high priority incidents | true | By month SUM | false | Benchmark: Number of high priority incid... |
| ☐ | ⓘ | Number of incidents resolved on first as... | true | By month SUM | false | Benchmark: Number of incidents resolved... |
| ☐ | ⓘ | Number of Knowledge Article Views | true | By month AVG | true | Benchmark: Number of knowledge article... |
| ☐ | ⓘ | Number of requested items closed | true | By month SUM | false | Benchmark: Number of requested items... |
| ☐ | ⓘ | Percentage of Incidents resolved on firs... | true | By month AVG | true | Benchmark: Percentage of incidents resol... |
| ☐ | ⓘ | Sum of time to close request items | true | By month SUM | false | Benchmark: Sum of time to close request... |
| ☐ | ⓘ | Total number of incidents | true | By month SUM | false | Benchmark: Number of incidents Resolved... |
| ☐ | ⓘ | Total resolution time for incidents | true | By month SUM | false | Benchmark: Sum of time to Resolve an inc... |
| ☐ | ⓘ | Total resolution time of high priority i... | true | By month SUM | false | Benchmark: Sum of time to resolve a High... |

INDICATOR VALUE AGGREGATION IN A MULTI-INSTANCE COMPUTING ENVIRONMENT

CROSS REFERENCE TO RELATED APPLICATION

This is a continuation of U.S. application Ser. No. 15/588,078, filed on May 5, 2017, the entire contents of which are herein incorporated by reference.

BACKGROUND

An electronic computing and communications system can process information using software executing on servers at a datacenter. Information about the performance of the software can be collected using performance management tools. An administrator or other user of the software can analyze the performance information to manage services available through the software, such as to resolve issues identified by the performance information.

SUMMARY

Disclosed herein are implementations of systems and techniques for indicator value aggregation in a multi-instance computing environment.

In an implementation, a system is provided for anonymously aggregating indicator values in a multi-instance computing environment. The system comprises a memory and a processor. The memory includes instructions executable by the processor to receive aggregations of indicator values from a plurality of customer instances, wherein at least one of the aggregations of indicator values is generated by a respective customer instance of the plurality of customer instances based on indicator values generated by the respective customer instance. The memory further includes instructions executable by the processor to filter the aggregations of indicator values using at least one filter to produce filtered aggregations. The memory further includes instructions executable by the processor to generate global indicator values by aggregating based on the filtered aggregations according to at least one characteristic associated with at least some of the plurality of customer instances, wherein each global indicator value is generated from one or more of the filtered aggregations that are greater than a minimum threshold. The memory further includes instructions executable by the processor to transmit one or more of the global indicator values to a customer instance of the plurality of customer instances having the at least one characteristic corresponding to the one or more of the global indicator values.

In an implementation, a method is provided for anonymously aggregating indicator values in a multi-instance computing environment. The method comprises receiving aggregations of indicator values from a plurality of customer instances, wherein at least one of the aggregations of indicator values is generated by a respective customer instance of the plurality of customer instances based on indicator values generated by the respective customer instance. The method further comprises filtering the aggregations of indicator values using at least one filter to produce filtered aggregations. The method further comprises generating global indicator values by aggregating based on the filtered aggregations according to at least one characteristic associated with at least some of the plurality of customer instances, wherein each global indicator value is generated from one or more of the filtered aggregations that are greater than a minimum threshold. The method further comprises transmitting one or more of the global indicator values to a customer instance of the plurality of customer instances having the at least one characteristic corresponding to the one or more of the global indicator values.

In an implementation, a non-transitory computer-readable storage medium is provided comprising processor-executable routines that, when executed by a processor, facilitate a performance of operations. The operations comprise receiving indicator values generated by applying indicator definitions to source data. The operations further comprise generating an aggregation of indicator values by aggregating based on the indicator values according to a benchmark indicator definition over a measurement interval. The operations further comprise transmitting the aggregation of indicator values to a central instance. The operations further comprise receiving a global indicator value corresponding to the transmitted aggregation of indicator values from the central instance.

These and other aspects of the present disclosure are disclosed in the following detailed description, the appended claims, and the accompanying figures.

BRIEF DESCRIPTION OF THE DRAWINGS

The description herein makes reference to the accompanying drawings, wherein like reference numerals refer to like parts throughout the several views.

FIG. 11 is an illustration of examples of a table storing indicator definitions and a table storing benchmark indicator definitions.

FIG. 16 is an illustration of an example of a form for configuring an application of a central instance to process aggregations of indicator values received from a customer instance.

FIG. 18 is an illustration of an example of a list of benchmark indicator definitions usable for aggregating indicator values at a customer instance.

FIG. 19 is an illustration of an example of a form for defining a benchmark formula for aggregating indicator values at a customer instance.

DETAILED DESCRIPTION

Figure 1:
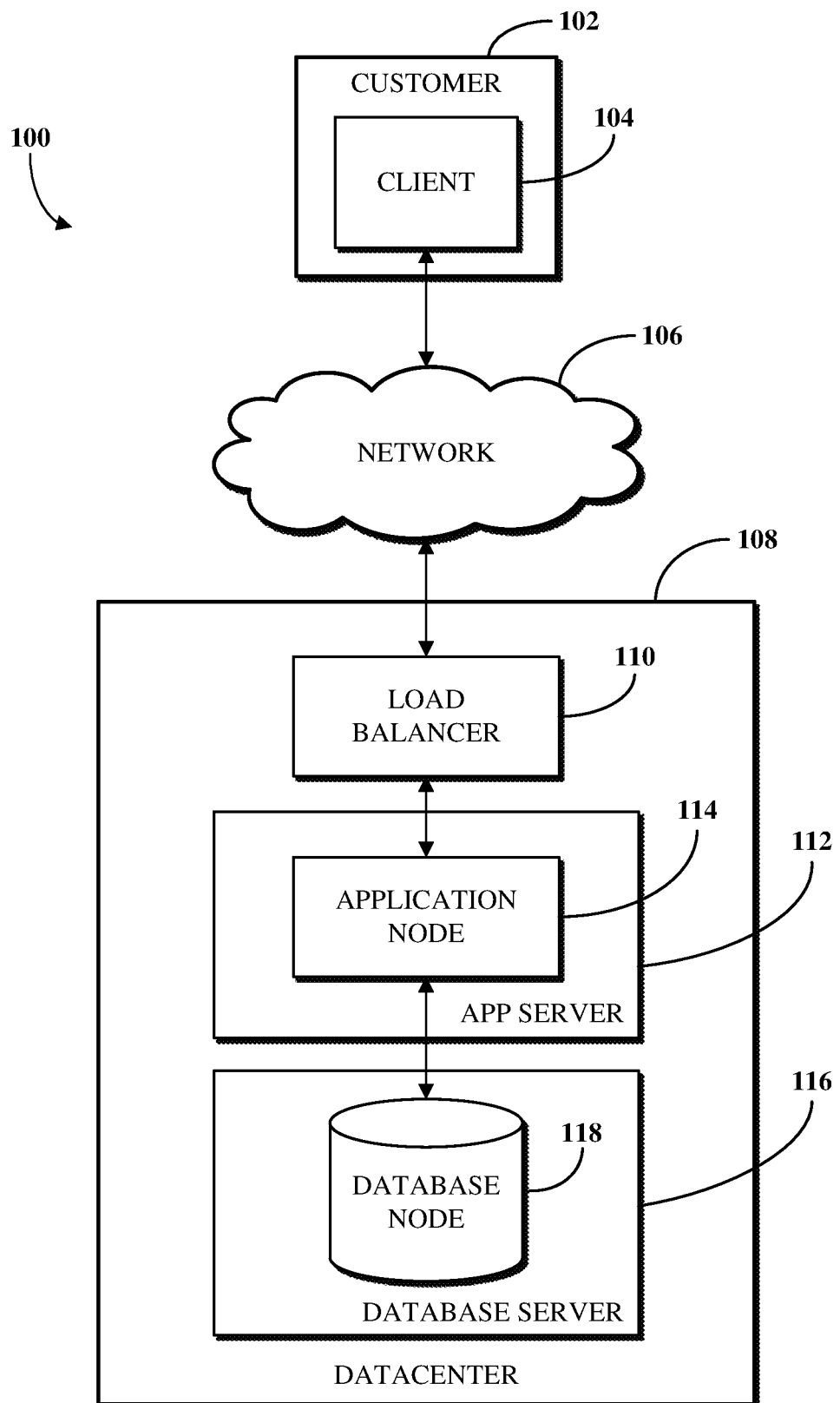
FIG. 1 is a block diagram of an example of an electronic computing and communications system.

Customers of a computing (e.g., Platform-as-a-Service (PaaS)) provider can use or develop application software that operates on or using configurable platform software. For example, the application software can include Information Technology Infrastructure Library (ITIL) or like functionality, such as for processing incidents, publishing articles, operating service catalogs, other purposes, or combinations thereof. The configurable platform software can include functionality permitting customers of a computing provider to monitor conditions associated with aspects of their application software using performance metrics, such as indicators. An instance of the platform software can be implemented using one or more application nodes and database nodes, such as described later with respect to FIG. 1.

An indicator, which may be but is not limited to a key performance indicator (KPI), performance score, or the like, is a measurement of data that may be used, for example, to better understand the performance of application software. An example indicator is a count of open incidents. The measurements of an indicator are referred to as indicator values. For example, there may be 500 open incidents on a Monday at 3 PM, and there may be 400 open incidents on the next day at 4 PM. The 500 or 400 open incidents would be indicator values for the respective days. The indicator values associated with an indicator can be generated using an indicator definition (e.g., as shown in FIG. 11). For example, an indicator definition may identify a table and query criteria that can be used to obtain a result that can be aggregated using an aggregation operation. In the foregoing example, an indicator definition may specify a table of "incident," a query criteria of "WHERE status='OPEN'," and an aggregation operation of "count." In some cases, the term "indicator" may refer generally to an indicator definition and/or its associated indicator value(s).

Indicator values can be reviewed and analyzed, such as to identify issues within application software or prepare solutions for resolving those issues. For example, a customer of a computing provider may use indicators to determine that incidents within its application software remain open for too long and modify its internal procedures to limit the periods of time that are available for resolving incidents.

Performance analytics functionality of an instance of platform software can generate indicator values for the application software. The indicator values may then be aggregated by the instance of platform software, such as to determine total, mean, median, or like statistics for the indicators over a period of time. However, these aggregated indicator values do not indicate performance metrics for the application software developed by other customers of the computing provider. Further, the design of certain computing environments, such as multi-instance environments in which the instances of platform software of different customers are isolated from one another, prevents the exchange of indicator values between instances of platform software used by different customers. As such, customers of such computing environments may not be able to compare and analyze their indicator values on a global scale with other instances of software of the computing environment.

Implementations of this disclosure address problems such as these by anonymously aggregating indicator values received from customer instances in a multi-instance computing environment. Aggregations of indicator values are received from the customer instances based on indicator values generated at the instances. These aggregations may, in some implementations, be associated with the customer instances from which they are received. The aggregations of indicator values are filtered using at least one filter to produce filtered aggregations. For example, the filter may include removing one or more of the aggregations of indicator values that are outside a bounded range (e.g., outliers). In such an example, the filtered aggregations may omit the removed one or more aggregations of indicator values. Global indicator values are then generated by aggregating based on the filtered aggregations according to at least one characteristic associated with at least some of the customer instances. The global indicators are an anonymous aggregation of indicator values because the data that makes up the global indicators cannot be traced back to the source customer instance(s). All or a portion of the global indicator values may then be transmitted to each customer instance based on the at least one characteristic thereof. The aggregations of indicator values are aggregated according to a benchmark indicator definition for combining two or more aggregation types for indicator values monitored by the instances.

Implementations of this disclosure provide technological improvements particular to computer networks, for example, those concerning the aggregation of indicator values received from multiple customer instances in a multi-instance computing environment. Computer network-specific technological problems, such as the generation of global indicator values using anonymized indicator values received from multiple customer instances in a multi-instance environment, can be wholly or partially solved by implementations of this disclosure. For example, software executing at an instance can generate indicator values based on indicator definitions. The indicator values can be aggregated using benchmark indicator definitions to generate aggregations of indicator values. Software executing on a server can use the aggregations of indicator values received from the customer instances to generate global indicator values. The generated global indicator values can correspond to the aggregation types associated with the benchmark indicator definitions. Implementations of this disclosure can thus introduce new and efficient improvements in the ways in which information is aggregated, collected, and filtered from instances in a multi-instance computing environment and used to generate global indicator values.

To describe some implementations in greater detail, reference is first made to examples of hardware structures. FIG. 1 is a block diagram of an example of an electronic computing and communications system 100. As used herein, the term "electronic computing and communications system," or variations thereof, can be, or include, a distributed computing system (e.g., a client-server computing system), a cloud computing system, a clustered computing system, or the like.

The system 100 can include one or more customers 102, which may be a public entity, private entity, or other corporate entity or individual that purchases or otherwise uses services of a software provider, such as a PaaS service provider. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit or as a combination of physical units. In some implementations, a single physical unit can include multiple clients.

The client 104 can be an instance of software running on a customer device associated with the customer 102. As used herein, the term "software" can include, but is not limited to, applications, programs, instances, processes, threads, services, plugins, patches, application version upgrades, or any other identifiable computing aspect capable of accessing or interacting with, directly or indirectly, a database. The system 100 can include any number of customers or clients or can have a configuration of customers or clients different from that generally illustrated in FIG. 1. For example, and without limitation, the system 100 can include hundreds or thousands of customers, and at least some of the customers can include or be associated with any number of clients. A customer can include a customer network or domain. For example, and without limitation, the client 104 can be associated or communicate with a customer network or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers or can include a configuration of datacenters and servers different from that generally illustrated in FIG. 1. For example, and without limitation, the system 100 can include tens of datacenters, and at least some of the datacenters can include hundreds or any suitable number of servers. In some implementations, the datacenter 108 can be associated or communicate with one or more datacenter networks or domains, which can include domains other than the client domain.

The client 104 and the servers associated with the datacenter 108 may be configured to connect to, or communicate via, a network 106. Furthermore, a client 104 associated with the customer 102 can connect to the network 106 via a communal connection point, link, or path, or using a distinct connection point, link, or path. A connection point, link, or path can be wired, wireless, use other communications technologies, or a combination thereof.

The network 106 can include, for example, the Internet, and/or the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, or a combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communications traffic, such as signals or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or software provided by the datacenter 108.

Maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

The datacenter 108 may include an application server 112 and a database server 116. The application server 112 or the database server 116 can be a computing system, which can include one or more computing devices, such as a desktop computer, a server computer, or any other computer capable of operating as a server. In some implementations, the application server 112 or the database server 116 can be non-hardware servers implemented on a physical device, such as a hardware server. In some implementations, the application server 112 and the database server 116 can be implemented as a single hardware server or as a single non-hardware server implemented on a single hardware server. Of course, any number of application servers or database servers can be implemented at the datacenter 108, and the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of web application software. The application node 114 can be implemented using processing threads, virtual machine instantiations, or other computing features of the application server 112. In some implementations, the application node 114 can store, evaluate, or retrieve data from a database, such as a database node 118 executing on the database server 116.

The application server 112 can include any suitable number of application nodes, depending upon a system load or other characteristics associated with the application server 112. For example, and without limitation, the application server 112 can include two or more nodes forming a node cluster. In some implementations, the application nodes implemented on a single application server 112 can run on different hardware servers.

The database server 116 can be configured to store, manage, or otherwise provide data for delivering services to the client 104 over a network. The database server 116 may include a data storage unit, such as the database node 118, which can be accessible by software executed on the application node 114. A database implemented by the database node 118 may be a relational database management system (RDBMS), an object database, an XML database, a configuration management database (CMDB), a management information base (MIB), one or more flat files, other suitable non-transient storage mechanisms, or a combination thereof. By way of non-limiting example, the system 100, in some implementations, can include an XML database and a CMDB. While limited examples are described, a database implemented using the database node 118 can be configured as or comprise any suitable database type. Further, the system 100 can include one, two, three, or any suitable number of databases configured as or comprising any suitable database type or combination thereof.

In some implementations, a database implemented using the database node 118 can be configured as or comprise a CMDB. A CMDB can comprise a plurality of configuration items (CIs), attributes associated with the CIs, or relationships between the CIs. A CI can be a CMDB record that represents an infrastructure entity, device, or units of the system 100. For example, the customer 102, the client 104, the network 106, the datacenter 108, the load balancer 110, the application server 112, the application node 114, the database server 116, the database node 118, or any other element, portion of an element, or combination of elements of the electronic computing and communications system 100 can be represented in the CMDB by a CI.

The CMDB can include information describing the configuration, the role, or both the configuration and the role, of an element of the system 100. In some implementations, an MIB can include one or more databases listing characteristics of the elements of the system 100. In some implementations, an object identifier (OID) can represent object identifiers of objects or elements in the MIB.

One or more databases (e.g., implemented using the database node 118), tables, other suitable information sources, or portions or combinations thereof may be stored, managed, or otherwise provided by one or more of the elements of the system 100 other than the database server 116, such as the client 104 or the application server 112.

In some implementations, a customer instance, which may also be referred to as an instance of platform software, can be implemented using one or more application nodes 114 and one or more database nodes 118. For example, the one or more application nodes 114 can implement a version of the platform software, and databases implemented by the one or more database nodes 118 can store data used by the version of the platform software. The customer instance associated with the customer 102 may be different from a customer instance associated with another customer. For example, the one or more application nodes and databases used to implement the platform software and associated data of a first customer may be different from the one or more application nodes and databases used to implement the platform software and associated data of a second customer. In some implementations, multiple customer instances can use one database node 118, such as wherein the database node 118 includes separate catalogs or other structure for separating the data used by platform software of a first customer and platform software of a second customer.

Some or all of the systems and techniques described herein can operate or be executed on or by the servers associated with the system 100. For example, an instance of software implemented by the application node 114 and the database node 118 can generate indicator values that, when aggregated, can be used by a central instance to generate global indicator values. In some implementations, the systems and techniques described herein, portions thereof, or combinations thereof can be implemented on a single device, such as a single server, or a combination of devices, for example, a combination of the client 104, the application server 112, and the database server 116.

In some implementations, the system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, or both servers and clients, can be monitored, controlled, configured, or a combination thereof.

The network 106, one or more datacenters, such as the datacenter 108, and one or more load balancers, such as the load balancer 110, may be implemented within a distributed computing system. A load balancer associated with a distributed computing system (e.g., the load balancer 110) can communicate with the network 106, one or more datacenters (e.g., the datacenter 108), other load balancers, or a combination thereof. The load balancer 110 can be configured to route communications to a primary datacenter, identify a failover condition (e.g., an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as implemented by the database node 118, and the secondary datacenter can include a secondary database. The secondary database can include an exact or substantially exact mirror, copy, or replication of the primary database. The primary database or the secondary database can be implemented as an RDBMS, an object database, an XML database, one or more flat files, or the like.

An application node implemented within a distributed computing environment can connect to or communicate with the primary database, which can be associated with the datacenter with which the application node is associated, or associated with another datacenter. For example, a primary datacenter can include a primary database and a first set of application nodes. A secondary datacenter can include a secondary database and a second set of application nodes. The application nodes of the first and second sets can provide a software service to remote clients, and can read or write data in the primary database. The secondary database can mirror changes made to the primary database and prevent write operations from being performed directly on the secondary database. In the event that a failover condition associated with the primary database is identified, the secondary database can operate as the primary database and can allow read or write access to data. The primary database can then operate as the secondary database, mirror the new primary database, and prevent direct write access to the new secondary database.

A distributed computing system can allocate resources of a computer network using a multi-tenant or single-tenant architecture, for example. Allocating resources in a multi-tenant architecture can include installations or instantiations of one or more servers, such as application servers, database servers, or any other server, or combination of servers, which can be shared amongst multiple customers. For example, a web server, such as a unitary Apache installation; an application server, such as a unitary Java Virtual Machine; or a single database server catalog, such as a unitary MySQL catalog, can handle requests from multiple customers. In some implementations of a multi-tenant architecture, the application server, the database server, or both can distinguish between and segregate data or other information of the various customers using the system.

In a single-tenant infrastructure (which can also be referred to as a multi-instance architecture), separate web servers, application servers, database servers, or combinations thereof can be provisioned for at least some customers or customer sub-units. Customers or customer sub-units can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof can be installed on the same physical server. An installation can be allocated a portion of the physical server resources, such as RAM, storage, communications bandwidth, or processor cycles.

A customer instance can include multiple web server instances, multiple application server instances, multiple database server instances, or a combination thereof. The server instances can be physically located on different physical servers and can share resources of the different physical servers with other server instances associated with other customer instances. In a distributed computing system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

Figure 2:
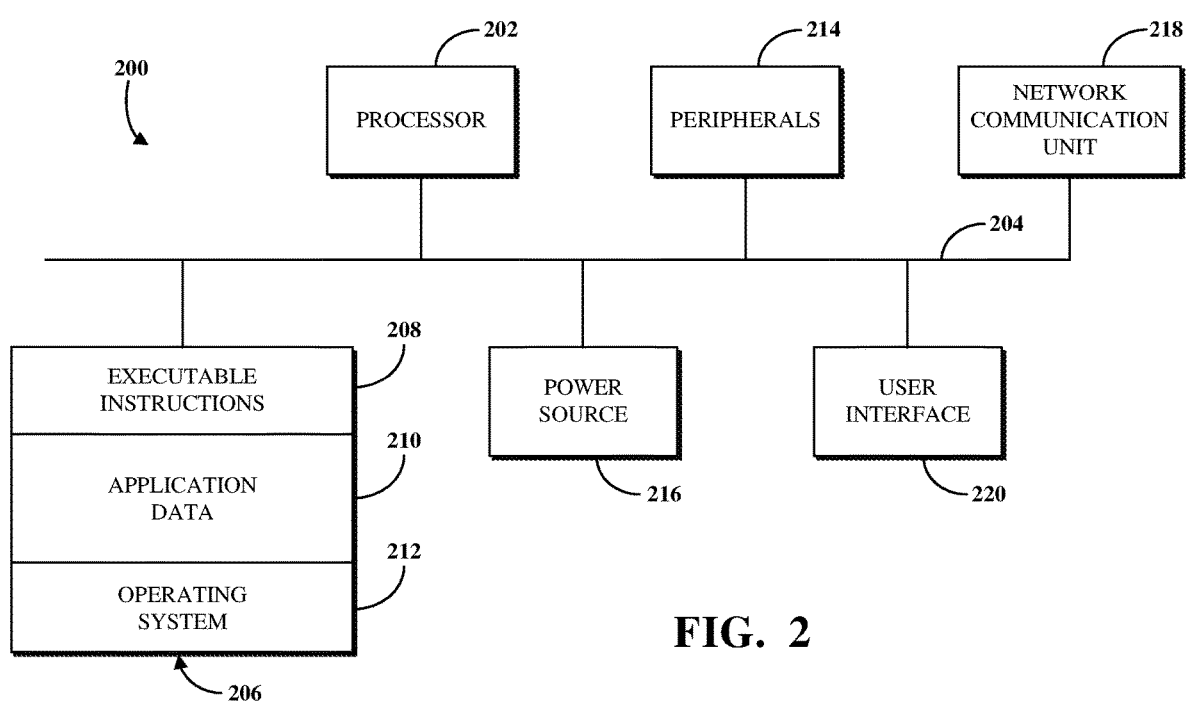
FIG. 2 is a block diagram of an example internal configuration of a computing device of an electronic computing and communications system.

FIG. 2 is a block diagram of an example of an internal configuration of a computing device 200 of an electronic computing and communications system, such as a client 104 or a server, such as an application server 112 or a database server 116, of the system 100 shown in FIG. 1. As previously described, a client or server can be a computing system including multiple computing devices or a single computing device, such as a mobile phone, a tablet computer, a laptop computer, a notebook computer, a desktop computer, a server computer, or other suitable computing devices.

A computing device 200 can include components or units, such as a processor 202, a bus 204, a memory 206, peripherals 214, a power source 216, a network communication unit 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204.

Although shown as a single block in FIG. 2, the memory 206 can be implemented as multiple units. For example, a computing device 200 can include volatile memory, such as RAM, and persistent memory, such as a hard drive or other storage. The memory 206 can be distributed across multiple clients or servers, such as network-based memory or memory in multiple clients or servers performing the operations of clients or servers.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions to receive aggregations of indicator values from customer instances, filter the aggregations of indicator values to produce filtered aggregations, generate global indicator values by aggregating based on the filtered aggregations, and transmit one or more of the global indicator values to an instance of software of the customer instances.

The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, or Linux®; an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, the power source 216 can be a battery, and the computing device 200 can operate independently of an external power distribution system. Any of the components of the computing device 200, such as the peripherals 214 or the power source 216, can communicate with the processor 202 via the bus 204. In some implementations, a client or server can omit the peripherals 214.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display (e.g., an OLED display), or other suitable display.

Figure 3:
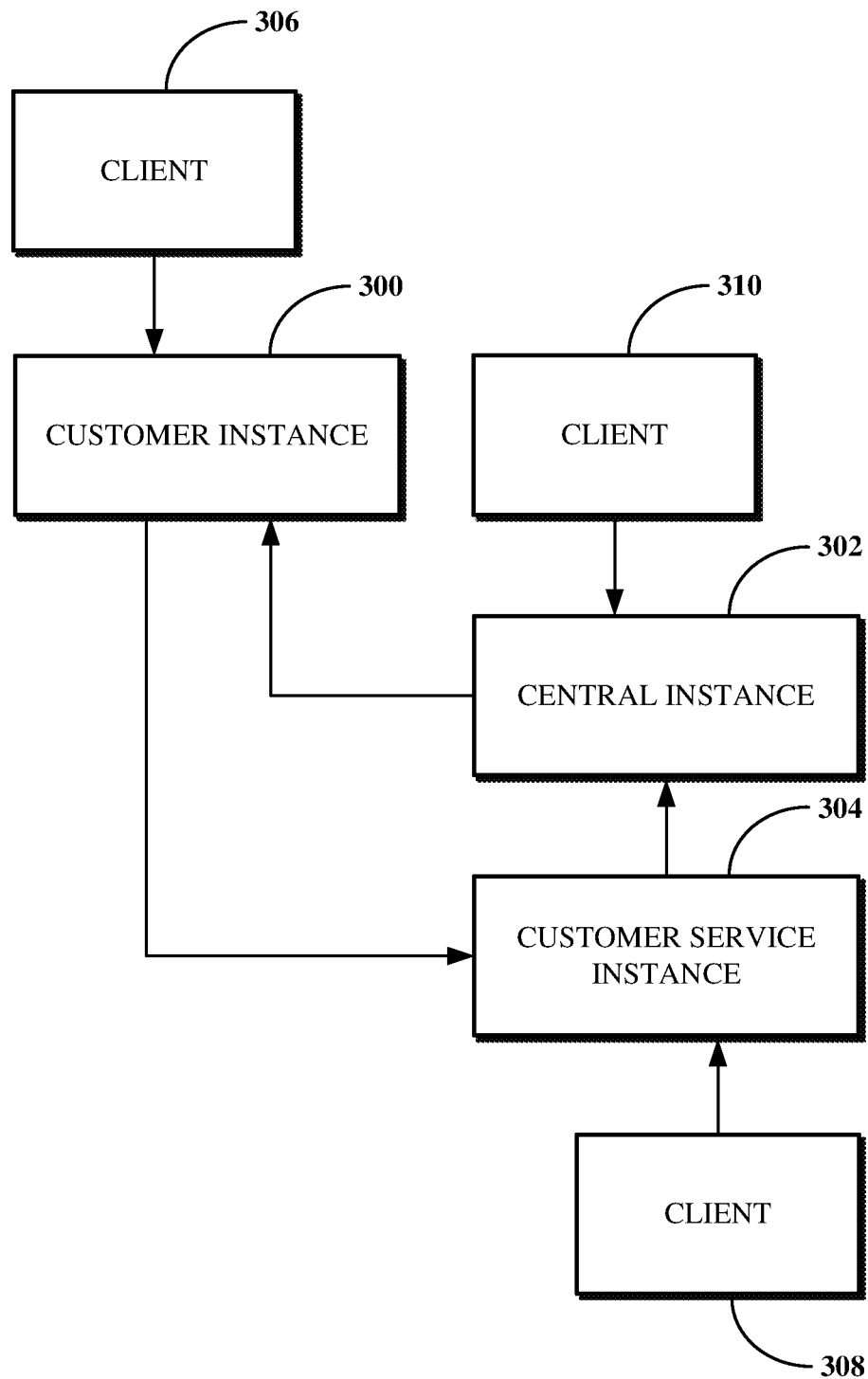
FIG. 3 is a block diagram of an example implementation including instances and clients.

FIG. 3 is a block diagram of an example implementation including instances 300, 302, and 304 and clients 306, 308, and 310. The example system for aggregating indicator values shown in FIG. 3 includes a customer instance 300, a central instance 302, and a customer service instance 304.

The customer instance 300 is an instance of software used or otherwise configured or developed by a customer of a computing provider. For example, the customer instance 300 may be an instance of configurable platform software, an instance of application software developed using configurable platform software, another instance of software, or a combination thereof.

The central instance 302 is an instance of software used or otherwise configured or developed by a computing provider. For example, the central instance 302 may be an instance of software for collecting aggregations of indicator values from one or more customer instances (e.g., the customer instance 300) or sending global indicator values to customer instances, such as described later with respect to FIGS. 4 and 5.

The customer service instance 304 is an instance of software for managing functionality and/or data associated with a customer instance, such as the customer instance 300. For example, the customer service instance 304 can be used to manage accounts authorized for use with the customer instance 300; monitor tasks performed or awaiting performance at the customer instance 300, reviewing incidents, change requests, problems, or the like; request information or services, such as through a service catalog; other functionality; or combinations thereof.

The instances 300, 302, and 304 can be implemented using one or more application nodes, such as the application node 114 shown in FIG. 1, and one or more databases, such as may be implemented using the database node 118 shown in FIG. 1.

One or more clients 306, 308, and 310 can be used to communicate with respective ones of the customer instance 300, the central instance 302, and/or the customer service instance 304. The clients 306, 308, and 310 can be clients such as the client 104 shown in FIG. 1. For example, the client 306 can be a device or virtual machine having access to the customer instance 300. The client 308 can be a device or virtual machine having access to the customer service instance 304. The client 310 can be a device or virtual machine having access to the central instance 302.

Implementations of the data exchanges and/or instances depicted in FIG. 3 can include additional, less, or combined functionality as compared to that described above, or functionality other than that described above, or combinations thereof. In some implementations, the clients 306, 308, and 310 can be one client configured to communicate with each of the customer instance 300, the central instance 302, and the customer service instance 304. In some implementations, one or more of the client 306, the client 308, or the client 310 can be configured to communicate with multiple ones of the customer instance 300, the central instance 302, and/or the customer service instance 304. For example, the client 306 may be able to communicate with the customer instance 300 and the central instance 302. In another example, the client 308 may be able to communicate with the customer service instance 304 and the customer instance 300.

Figure 4:
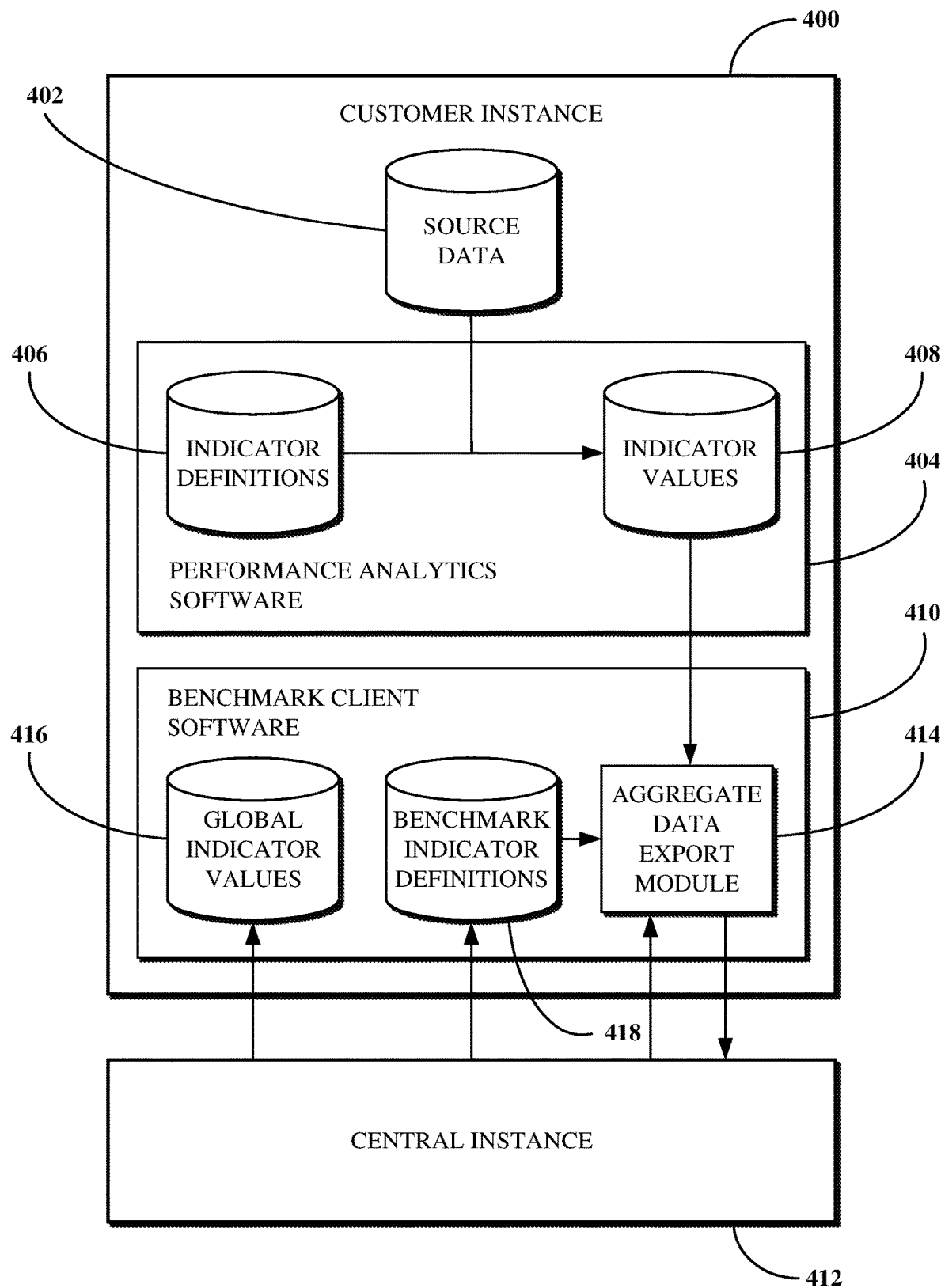
FIG. 4 is a block diagram of an example of a customer instance that generates aggregations of indicator values.

FIG. 4 is a block diagram of an example of a customer instance 400 that generates aggregations of indicator values. The customer instance 400 may, for example, be the customer instance 300 shown in FIG. 3. Source data 402 associated with the customer instance 400 may include incidents, requests, published article views, or other events or processes associated with the customer instance 400. The source data 402 can be generated within the customer instance 400, received from clients in communication with the customer instance 400, retrieved from a database or other data store external to the customer instance 400, obtained from other sources or using other techniques, or combinations thereof.

The source data 402 can be retrieved or otherwise obtained by performance analytics software 404 executing within the customer instance 400. The performance analytics software 404 includes functionality for generating indicator values 408 (described below) by applying indicator definitions 406 to the source data 402. The indicator definitions 406 are definitions of how to generate the indicator values 408. For example, an indicator definition may define a first layer measurement interval (e.g., one day, one week, or the like) for generating the indicator values 408, an aggregation operation type (e.g., total count, average, median, or the like) for generating the indicator values 408, a location of the source data 402 used to generate the indicator values 408 (e.g., a table of records within a database), other criteria (e.g., status, time open, assignee, or the like), or combinations thereof. An example table for storing the indicator definitions 406 is described later with respect to FIG. 11 (as a first layer of aggregation table 1100).

The indicator values 408 are generated by aggregating individual indicator values by the performance analytics software 404 over the first layer measurement interval. The manner in which the individual indicator values are aggregated can be specified by the indicator definitions 406. For example, one indicator definition may specify that a total number of incidents opened in one day can be aggregated at the end of the day to generate an indicator value therefor. In another example, another indicator definition may specify that a total number of events created in one day can be aggregated throughout the day, such as responsive to each individual event being created.

A number of definitions may be included in the indicator definitions 406, subject to technical or other constraints within the system, for example, due to resource constraints or the like. The indicator definitions can relate to a common set of records or different records associated with an instance of software. For example, the indicator definitions may relate to sets of records for different functionalities of the instance of software (e.g., a service management application, an operations management application, a software development application, or the like, or combinations thereof). The records associated with different functionalities of the instance of software may include disparate data. For example, records of a service management application may be stored in one database structure (e.g., having first database schema, tables, columns, or the like), whereas records of an operations management application may be stored in another database structure (e.g., having second database schema, tables, columns, or the like).

The performance analytics software 404 uses the source data 402 and the indicator definitions 406 to generate the indicator values 408 for respective indicator definitions 406. An administrator or like user of the customer instance 400 may use the performance analytics software 404 to selectively modify the indicator definitions 406 that are used by the performance analytics software 404. For example, the administrator or like user may modify the indicator definitions 406 such as by adding new indicator definitions, removing existing indicator definitions, or changing ones of the existing indicator definitions. Modifying the indicator definitions 406 causes the performance analytics software 404 to generate indicator values for different indicator definitions 406. An administrator or like user of the customer instance 400 may change the indicator definitions 406 in this way, for example, to comply with business practices or other requirements of the customer.

The performance analytics software 404 can generate an indicator value by querying a database or other data store for records associated with an indicator definition. For example, the performance analytics software 404 can generate an indicator value for the total number of open incidents by querying a database table that stores records associated with incidents of the customer instance 400 for records where the status is "open." For example, the query can be a database statement expressed in a query language, such as the Structured Query Language (SQL), such as "query incident_table where status=open" or the like. Other queries that can be performed to generate the indicator values 408 include, for example, a total number of incidents resolved on a particular day (e.g., "query incident_table where status=resolved and data=mmddyyyy"), a total number of item requests fulfilled on a particular day (e.g., "query item_request table where status=fulfilled and date=mmddyyyy"), a total number of knowledgebase articles viewed on table "kb_use" that were created on a particular date (e.g., "query kb_use where status=published and data=mmddyyyy").

The performance analytics software 404 can generate the indicator values 408 on a daily or other basis. For example, a scheduled job of the performance analytics software 404 can obtain (e.g., receive and/or retrieve) the source data 402 from one or more indicator sources and use applicable ones of the indicator definitions 406 to generate the indicator values 408. Alternatively, the performance analytics software 404 can generate the indicator values 408 responsive to a command, such as an application programming interface (API) call to the performance analytics software 404 received from a client in communication with the customer instance 400.

The indicator values 408 are retrieved by benchmark client software 410 executing within the customer instance 400. For example, retrieving the indicator values 408 to the benchmark client software 410 can include the benchmark client software 410 receiving the indicator values 408 from the performance analytics software 404. In another example, the benchmark client software 410 can retrieve the indicator values 408 from storage, such as within a database (e.g., implemented using the database node 118 shown in FIG. 1).

The indicator values 408 can be retrieved by the benchmark client software 410 according to a schedule. In some implementations, indicator values may be retrieved by the benchmark client software 410 on a daily, weekly, monthly or other basis. For example, indicator values that are generated during a given day can be retrieved by the benchmark client software 410 once that day ends (e.g., at midnight or another time, as may be set by default or configured by a user of the benchmark client software 410).

The benchmark client software 410 can generate aggregations of the indicator values such as by using data received from the performance analytics software 404. The aggregations of indicator values are generated using one or more benchmark indicator definitions 418 available to the benchmark client software 410 as part of a benchmark feature available within the customer instance 400. A benchmark indicator definition has an aggregation type that is a combination of two or more aggregation types of indicator definitions 406 used by the performance analytics software 404. As such, the aggregations of indicator values permitted by the benchmark feature operate as a wrapper on top of the indicator values received from the performance analytics software 404, such as to permit different aggregations of indicator values to be tracked and measured across customer instances.

As will be described below, the central instance 412 can be used to generate benchmark indicator definitions 418 that are used by the benchmark client software 410 to generate aggregations of indicator values. The benchmark client software 410 can receive or otherwise retrieve the benchmark indicator definitions 418 from the central instance 412. The benchmark client software 410 can be limited to generating aggregations of indicator values according to the benchmark indicator definitions defined at the central instance 412, for example, so that the central instance 412 can track indicator values across customer instances. Accordingly, the central instance 412 may not be able to generate global indicator values for aggregations of indicator values not generated using the benchmark indicator definitions 418.

Examples of the benchmark indicator definitions 418 that can be used to generate aggregations of indicator values include, but are not limited to, a percentage of resolved incidents that are high priority, a percentage of resolved incidents that closed on a first assignment, an average time to resolve a high priority incident, an average time to resolve any incident, an average time to resolve or otherwise fulfill a service catalog request, and a total number of published article views per month. An example table for storing the benchmark indicator definitions 418 is described later with respect to FIG. 11 (as a second layer of aggregation table 1110).

The benchmark indicator definitions 418 can be expressed as benchmark formulas. For example, a benchmark indicator definition to aggregate indicator values based on a total number of incidents that are high priority can be expressed using the benchmark formula "Benchmark Indicator Definition=Number High Priority Incidents/Total Incidents." In some cases, the indicator definitions used within a benchmark formula can be represented using variables. For example, the above benchmark formula can be expressed as "I=X/Total Incidents," wherein I represents the benchmark indicator definition used for aggregation and X represents the number of high priority incidents then currently open for the customer instance 400.

The benchmark client software 410 includes functionality for validating the benchmark formulas used to generate aggregations of indicator values. For example, the benchmark client software 410 can process a benchmark formula to verify that the aggregation type of the benchmark formula output is included in the list of benchmark indicator definitions 418 available to the benchmark client software 410. In another example, the benchmark client software 410 can process a benchmark formula to verify that the aggregation types of the individual constituents of the benchmark formula are included in the list of benchmark indicator definitions 418 available to the benchmark client software 410. In yet another example, the benchmark client software 410 can process a benchmark formula by replacing values of the indicator definitions used therein with test values corresponding to those indicator definitions.

The aggregations of indicator values can be generated by the benchmark client software 410 according to a schedule. For example, the benchmark client software 410 can collect indicator values generated by the performance analytics software 404 over a second layer measurement interval within which the indicator values are generated (e.g., one day, one week, one month, or the like) and generate the aggregations of indicator values once the second layer measurement interval ends. For example, a first layer measurement interval for which an indicator value is generated can be one day, and the second layer measurement interval for which an aggregation of indicator values is generated can be one month. The benchmark client software 410 can thus generate the aggregations of indicator values on a monthly basis, such as using the indicator values generated daily by the performance analytics software 404.

The benchmark client software 410 can include functionality for flagging ones of the benchmark indicator values 418 that are usable to generate the aggregations of indicator values. The performance analytics software 404 can include functionality for flagging the source data 402, such as based on the sources of indicator values used to generate aggregations of indicator values. One or more access control lists (ACLs) can be used to limit the types of the source 402 data that can be flagged. For example, an ACL may be implemented to limit the types of the source data 402 that may be flagged for a source of the source data 402 responsive to a change in condition of the source (e.g., where the source is software that has been disabled). Functionality for flagging data by the benchmark client software 410 or the performance analytics software 404 can be used to identify the data usable for the central instance 412 to generate the global indicator values 416.

The benchmark client software 410 includes functionality for transmitting aggregations of the indicator values to a central instance 412 (e.g., the central instance 302 shown in FIG. 3), such as by using an aggregate data export module 414. The aggregate data export module 414 of the benchmark client software 410 can transmit one or more aggregations of the indicator values using a function of an API of software of the central instance 412. For example, the API can be a Representational State Transfer (ReST) API.

The benchmark client software 410 can transmit the aggregations of indicator values to the central instance 412 on a scheduled basis. For example, the central instance 412 can calculate a hash value for the customer instance 400, such as based on an identifier associated with the customer instance 400. The customer instance 400 can then upload the aggregations of indicator values to the central instance 412 at a specific date and time determined using the hash value. In another example, the benchmark client software 410 can include a job for scheduling transmissions of the aggregations of indicator values, such as based on an identifier of the customer instance 400 being spanned at the central instance 412.

Communications between the customer instance 400 and the central instance 412 can be secured using authentication techniques. For example, one authentication technique may use script include names and custom headers to communicate credentials for authorizing the customer instance 400 to communicate with the central instance 412 and vice versa. In another example, a user profile associated with the customer instance 400 can be registered to the central instance 412 while the benchmark client software 410 remains enabled at the customer instance 400. The user profile can be used for authenticating communications between the customer instance 400 and the central instance 412, such as by using the credentials of the customer instance 400.

The central instance 412 can use the aggregations of indicator values transmitted from the customer instance 400 and aggregations of indicator values transmitted from other customer instances to generate global indicator values 416. The global indicator values 416 represent trends in various indicator values generated by the customer instances. The global indicator values 416 may include global scores for the customer instances. Similarly, the indicator values 408 and/or the aggregations of indicator values transmitted to the central instance may include individual customer scores.

The benchmark client software 410 includes functionality for requesting and/or retrieving the global indicator values 416 from the central instance 412. For example, the benchmark client software 410 can request and/or retrieve the global indicator values 416 using a function of an API (e.g., a ReST API) of software of the central instance 412. The API used to request and/or retrieve the global indicator values 416 can be the same API as is used to transmit the aggregations of indicator values to the central instance 412 (e.g., by the aggregate data export module 414). Alternatively, the API used to request and/or retrieve the global indicator values 416 can be an API different from the API that is used to transmit the aggregations of indicator values to the central instance 412. The benchmark client software 410 can request and/or retrieve the global indicator values 416 from the central instance 412 on a scheduled basis. For example, the benchmark client software 410 can download the global indicator values 416 from the central instance 412 at a specific date and time. The specific date and time for downloading the global indicator values 416 can be determined by the central instance 412 using a hash value, such as may be calculated by the central instance 412 based on an identifier associated with the customer instance 400.

However, the global indicator values 416 that are requested and/or retrieved by the benchmark client software 410 may be a subset of the global indicator values that are generated by the central instance 412. The global indicator values 416 that are transmitted to the customer instance 400 correspond to the aggregations of indicator values that are transmitted to the central instance 412 from the customer instance 400. As such, the central instance 412 may not transmit global indicator values to the customer instance 400 where they correspond to aggregations of indicator values not received from the customer instance 400 (e.g., but where they are instead received from one or more other customer instances).

The benchmark client software 410 includes functionality for viewing data associated with the global indicator values 416 transmitted from the central instance 412. For example, all or a portion of the global indicator values 416 can be published to a benchmark dashboard accessible within the benchmark client software 410, which benchmark dashboard can store the published global indicator values 416 within staging tables. An authorized user of the customer instance 400 can use the benchmark dashboard feature of the benchmark client software 410 to compare or analyze trends in the global indicator values 416, such as to compare values of the global indicator values 416 to corresponding values of the aggregations of indicator values transmitted to the central instance (e.g., by the aggregate data export module 414).

For example, the benchmark dashboard feature of the benchmark client software 410 can include a scorecard for scoring respective values of the aggregations of indicator values against the global indicator values 416; one or more graphs, trends, charts, or other visualizations representing the aggregations of indicator values and/or the global indicator values 416, for example, in a time-series format; drilldown assessments including potential issues identifiable using the aggregations of indicator values, either alone or as compared to the global indicator values 416; other functionality; or combinations thereof.

A benchmark common software (not shown) can be installed at each of the customer instance 400 and the central instance 412. For example, benchmark common software may include the components used by benchmark client software and benchmark central software and the components used by the benchmark common software may depend on whether the benchmark common software is installed at a central instance or at a customer instance. For example, the benchmark common software can maintain a list of the benchmark indicator definitions 418 available for generating the global indicator values 416. The list maintained by the benchmark common software may be updated, for example, based on data received from the central instance 412.

Implementations of the customer instance depicted in FIG. 4 can include additional, less, or combined functionality as compared to that described above, or functionality other than that described above, or combinations thereof. In some implementations, the benchmark client software 410 can use the list of benchmark indicator definitions 418 to generate the aggregations of indicator values, such as by using selected ones of the benchmark indicator definitions 418 included in the list. The central instance 412 may include functionality for detecting when the benchmark client software 410 generates aggregations of indicator values using a definition not included in the list of benchmark indicator definitions 418. In such cases, the central instance 412 may discard those aggregations of indicator values.

In some implementations, the aggregations of indicator values are generated by the performance analytics software 404 instead of by the benchmark client software 410. For example, the performance analytics software 404 can generate the aggregations of indicator values by aggregating the indicator values 408, such as according to one or more aggregation operation types corresponding to ones of the indicator definitions 406 used to generate the indicator values 408. The aggregations of indicator values may then be retrieved by the benchmark client software 410 for export to the central instance 412 via the aggregate data export module 414.

In some implementations, the aggregation of indicator values by the performance analytics software 404 can be a first aggregation, such as according to a first aggregation operation type. For example, the benchmark client software 410 can receive the first aggregation of indicator values from the performance analytics software 404. The benchmark client software 410 can then perform a second aggregation, such as by aggregating the first aggregations according to the benchmark indicator definitions 418 (e.g., benchmark formulas) for aggregating based on multiple aggregation operation types and/or multiple types of indicator definitions.

In some implementations, the benchmark client software 410 can include functionality for validating the aggregations of indicator values received from the performance analytics software 404. For example, the benchmark client software 410, via the aggregate data export module 414 or another module or other implement, may query a database or other data store used by the performance analytics software 404 to store the indicator definitions 406. The benchmark client software 410 can use the results of that query to validate that the aggregations of indicator values were generated in accordance with appropriate indicator definitions. In some implementations, the benchmark client software 410 can include functionality for permitting an administrator or like user thereof to define conditions for generating aggregations of indicator values. For example, an administrator of the customer instance 400 may define a condition indicating that a high priority incident is an incident having a value of 1 or 2, instead of only 1. An aggregation of indicator values may be generated for a benchmark indicator definition using high priority incidents (e.g., total number of incidents that are high priority). That aggregation of indicator values may be generated using indicator values corresponding to incident priority values of 1 or 2. In some implementations, the performance analytics software 404 may also include functionality for defining conditions, for example, for generating the indicator values 408 based on the source data 402.

In some implementations, the administrator or like user of the customer instance 400 can selectively enable or disable the benchmark client software 410. For example, if the customer no longer wants to participate in the benchmark program, the administrator or like user of the customer instance 400 may opt out of it by disabling the benchmark client software 410. Disabling the benchmark client software 410 can include transmitting a request to disable the benchmark client software 410 from the customer instance 400 to the central instance 412. Alternatively, disabling the benchmark client software 410 can include uninstalling the benchmark client software 410 from the customer instance 400.

The customer may thereafter opt back into the benchmark program by enabling the benchmark client software 410. Enabling the benchmark client software 410 can include transmitting a request to enable the benchmark client software 410 from the customer instance 400 to the central instance 412. Alternatively, enabling the benchmark client software 410 can include installing the benchmark client software 410 within the customer instance 400 (e.g., by downloading instructions or the like from the central instance 412 or another host where the instructions or the like are available). In some implementations, the administrator or like user of the benchmark client software 410 can selectively enable or disable ones of the benchmark indicator definitions 418.

In some implementations, the benchmark client software 410 can include functionality for persisting the global indicator values 416 received from the central instance 412, for example, for later reference or comparison to further global indicator values that may be received from the central instance 412 in the future. In some implementations, the benchmark client software 410 can include functionality for visualizing data, such as the global indicator values 416 and the aggregations of indicator values exported to the central instance 412 from the customer instance 400. For example, the benchmark client software 410 can use one or both of the global indicator values 416 or those aggregations of indicator values to generate graphs, charts, or like visualizations for comparing or analyzing trends in the indicator data. The indicator data used in those visualizations can be configured by a user of the benchmark client software 410, for example, to visualize indicator data according to an industry category, an industry size, or other characteristics. The benchmark client software 410 can generate downloadable visualizations to a user thereof.

Figure 5:
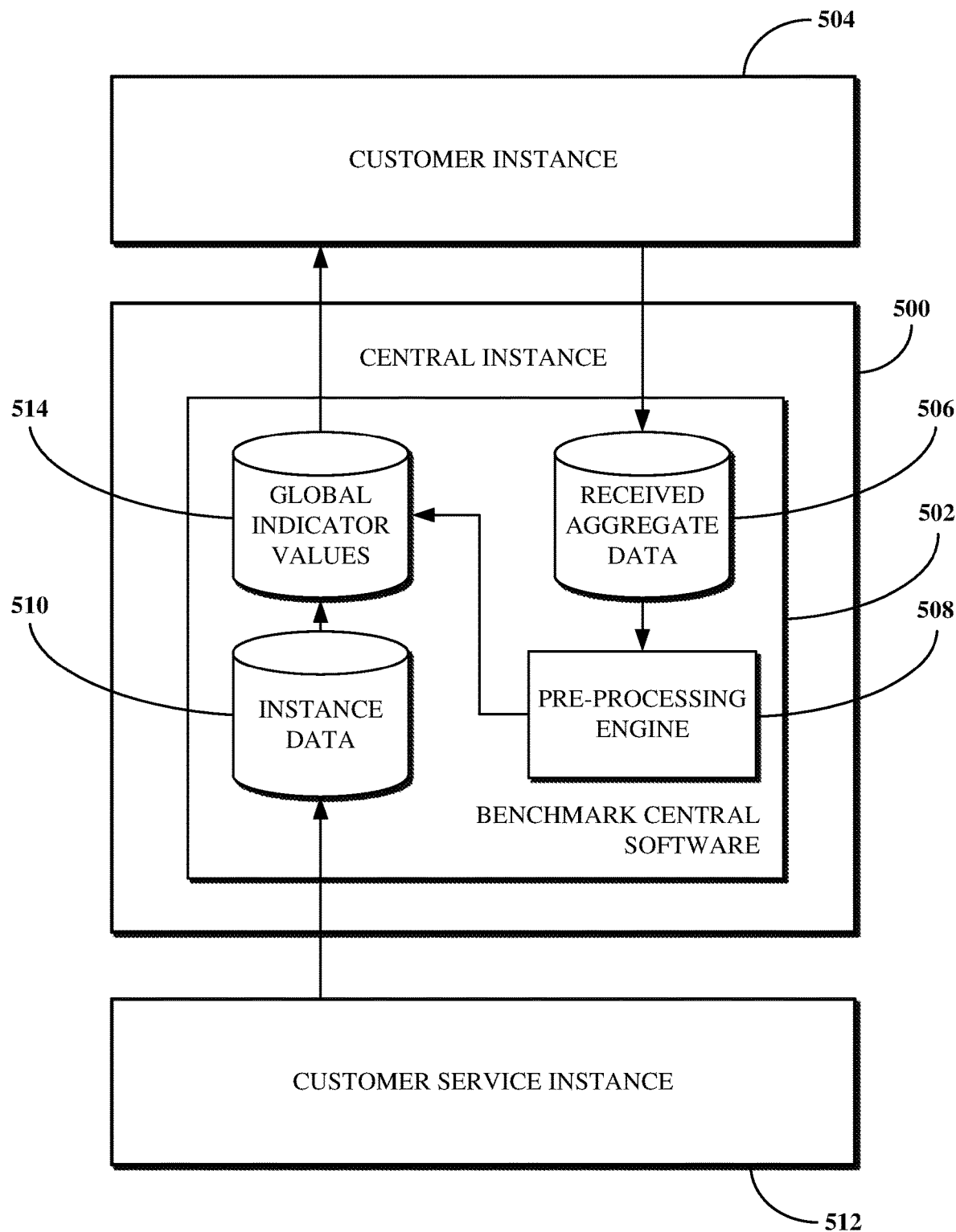
FIG. 5 is a block diagram of an example of a central instance that generates global indicator values using aggregations of indicator values received from customer instances.

FIG. 5 is a block diagram of an example of a central instance 500 that generates global indicator values using aggregations of indicator values received from customer instances. The central instance 500 may, for example, be the central instance 302 shown in FIG. 3 and/or the central instance 412 shown in FIG. 4. Benchmark central software 502 executing in the central instance 500 is used to receive aggregations of indicator values transmitted from one or more customer instances, such as a customer instance 504 (which may, for example, be the customer instance 300 shown in FIG. 3 and/or the customer instance 400 shown in FIG. 4). The received aggregate data 506 includes aggregations of indicator values transmitted to the central instance 500 from one or more customer instances, such as the customer instance 504 (e.g., individual customer scores transmitted from the customer instance 400 shown in FIG. 4 using the aggregate data export module 414 shown in FIG. 4).

The pre-processing engine 508 includes functionality for processing the received aggregate data 506. For example, the pre-processing engine 508 includes an outlier engine. The outlier engine includes definitions of outliers corresponding to benchmark indicator definitions used to generate the aggregations of indicator values included in the received aggregate data 506. A definition of an outlier can include one or more of a threshold maximum value of indicator values that can be used to calculate global indicator values or a threshold minimum value of indicator values that can be used to calculate global indicator values. The outlier engine executes instructions (e.g., scripts, such as JavaScript code) to determine whether the received aggregate data 506 includes outliers according to corresponding definitions of outliers. The results of that determination are used to filter the received aggregate data 506, such as to produce filtered aggregations. The outlier engine can execute on a scheduled basis (e.g., the fifteenth day of each month), responsive to a command, on other bases, or combinations thereof.

For example, a definition of an outlier corresponding to indicator definitions for the average time to resolve incidents can include a range of values that may be used to generate global indicator values, such as according to a defined threshold maximum value and a defined threshold minimum value. The defined threshold maximum value could be five days, for example, such that incidents not resolved within five days may be considered unresolvable. The defined minimum threshold value could be one minute, for example, such that incidents resolved sooner than one minute from when they are opened may have been opened unintentionally. As such, for any indicator values of the received aggregate data 506 that correspond to the indicator definition of average time to resolve incidents, the outlier engine can filter those indicator values to discard any of those indicator values that are not included within the defined range.

The selection of definitions of outliers to be used by the outlier engine can be automated by the outlier engine, for example, based on the indicator definitions used to generate the aggregations of indicator values received from the customer instances. Alternatively, the definitions of outliers used by the outlier engine can be selectively configured and applied, such as by an administrator or like user of the benchmark central software 502. For example, the benchmark central software 502 can use definitions of outliers, which may, for example, be stored in a database or other data store accessible by the benchmark central software 502. Certain ones of the definitions of outliers may pertain to a common indicator definition or aggregation operation type. In such cases, the administrator or like user may select one of those definitions of outliers to use for those indicator definitions or aggregation operation types. In some implementations, one or more default filters (e.g., enabled out of the box) can be or otherwise include the definitions of outliers to be used by the outlier engine.

The definitions of outliers usable by the benchmark central software 502 can include default definitions of outliers, such as may be configured according to out-of-the-box settings for the benchmark central software 502. The definitions of outliers usable by the benchmark central software 502 can be updated, such as on-demand (e.g., responsive to instructions received at the central instance 500) or scheduled (e.g., where a check for changes to the definitions of outliers used by the benchmark central software 502 is made by the central instance 500, such as on a daily, weekly, monthly, or like basis).

The instructions executed by the outlier engine can correspond to one or more outlier models generated for different aggregations of indicator values that may be received from one or more customer instances. The one or more outlier models can be automatically selected by the outlier engine, such as based on the indicator definitions of the received aggregations of indicator values. Alternatively, an administrator or like user of the benchmark central software 502 can select the one or more outlier models to control the instructions that are executed by the outlier engine. For example, even where two outlier models correspond to a common indicator definition of the aggregations of indicator values, each may produce different results based on the instructions that are associated therewith.

The benchmark central software 502 includes functionality for receiving instance data 510 from a customer service instance 512, which, for example, may be the customer service instance 304 shown in FIG. 3. The instance data 510 includes characteristics associated with customer instances from which all or a portion of the received aggregate data 506 is received. The characteristics associated with a customer instance can include, for example, information indicative of the name of a company associated with the customer instance (e.g., where the company is the customer that uses or otherwise configures or develops the customer instance), an industry to which the customer pertains, a size of the company and/or industry, an identifier of the customer instance (e.g., used by the computing provider that operates the central instance 500 to identify the customer instance within its systems), whether the customer has opted into the benchmark feature, other credentials associated with the customer, or the like, or combinations thereof.

The benchmark central software 502 uses the results of the pre-processing engine 508 (e.g., the filtered aggregations produced responsive to instructions executed by an outlier engine) and the instance data 510 received from the customer service instance 512 to generate global indicator values 514. The global indicator values 514 can be generated by aggregating based on the filtered aggregations produced by the pre-processing engine 508 and according to the instance data 510. For example, the global indicator values 514 can be generated by aggregating corresponding ones of the filtered aggregations by industry, by size, other characteristics, or combinations thereof. In another example, the global indicator values 514 can be generated by aggregating corresponding ones of the filtered aggregations overall, such as independently of characteristics of the instance data 510. The global indicator values 514 can be generated on a scheduled basis (e.g., the sixteenth day of each month), responsive to a command, on other bases, or combinations thereof.

The global indicator values 514 are generated as median values or average values. A standard median value can be calculated from the filtered aggregations of indicator values processed by the pre-processing engine 508 for each aggregation type. An average value can be calculated differently based on whether the aggregations of indicator value are generated using a benchmark formula. If a benchmark formula is not used, an average value can be calculated using summed values for all customer instances from which applicable aggregations of indicator values are received that are divided by the total number of customer instances from which any aggregations of indicator values are received. If a benchmark formula is used, the summed values for all customer instances from which applicable aggregations of indicator values are received replace the indicator definitions included within the benchmark formula.

The global indicator values 514 can be published, such as to a website, downloadable document, portal, or other object or online location available to customers associated with the customer instances from which the received aggregate data 506 is received (e.g., responsive to a command, such as a ReST API call to the benchmark central software 502). For example, all or a portion of the global indicator values 514 can be published to a benchmark dashboard accessible within the customer instance 504. The global indicator values 514 can also or instead be published to a location accessible by authorized users of the central instance 500 (e.g., an administrator or like user thereof). For example, the global indicator values 514 can be published to an internal benchmark dashboard accessible within the central instance 500, which can store the published global indicator values 514 within staging tables. An authorized user of the central instance 500 can use the internal benchmark dashboard to compare or analyze trends in the global indicator values 514 and/or the received aggregate data 506, such as for different customers from which the received aggregate data 506 is received. The central instance 500 may include functionality for notifying an administrator or like user of the customer instance 504 that the global indicator values 514 have been published, such as by transmitting a message to the customer instance 504. For example, the functionality of the central instance 500 can automatically generate and transmit an email to an account associated with the customer instance 504 responsive to the publishing of the global indicator values 514.

Implementations of the central instance depicted in FIG. 5 can include additional, less, or combined functionality as compared to that described above, or functionality other than that described above, or combinations thereof. In some implementations, an administrator or like user of the central instance 500 may use the benchmark central software 502 to generate outlier models (e.g., based on outlier data collected, generated, or otherwise identified using the pre-processing engine 508), associate ones of the outlier models with different indicator definitions used by the customer instances, selectively execute outlier models on selected sets of aggregations of indicator values received from customer instances, perform other processing in connection with the outlier data, or combinations thereof.

In some implementations, the pre-processing engine 508 can have functionality beyond discarding values of data from the received aggregate data 506. For example, the pre-processing engine 508 can have functionality for anonymizing the received aggregate data 506. The aggregations of indicator values transmitted from the customer instances can have information indicating or otherwise associating that data with the customer instance from which it was transmitted. As such, the pre-processing engine 508 can de-identify the aggregations of indicator values from the respective customer instances that generated them.

In some implementations, the benchmark central software 502 can include functionality for deleting published global indicator values, such as from staging tables or other sources to which they are published for download by the customer instance 504. For example, the benchmark central software 502 can execute a scheduled job to remove any processed global indicator value data from the staging tables. The scheduled job can run on a monthly basis, such as on the twenty-fifth day of each month.

In some implementations, an administrator or other authorized user of the central instance 500 can use the benchmark central software 502 to process requests received from the customer instance 504 to enable or disable the benchmark feature thereof. For example, software executing at the customer instance 504 can include functionality for enabling or disabling the benchmark feature for the customer instance 504. The software executing at the customer instance 504 can transmit a request to enable or disable (as applicable) the benchmark feature to the benchmark central software 502. In some implementations, the benchmark feature for the customer instance 504 can be selectively enabled or disabled responsive to a command, such as a ReST API call.

The benchmark central software 502 can enable the benchmark feature in the customer instance 504 by permitting the upload of aggregations of indicator values from the customer instance 504 to the central instance 500, for example, by adding an identifier of the customer instance 504 to a list of customer instances from which the central instance 500 can receive aggregations of indicator values. Alternatively, the benchmark central software 502 can enable the benchmark feature in the customer instance 504 by installing the benchmark feature at the customer instance 504.

The benchmark central software 502 can disable the benchmark feature in the customer instance 504 by denying requests from the customer instance 504 to upload aggregations of indicator values to the central instance 500, for example, by removing an identifier of the customer instance 504 from a list of customer instances from which the central instance 500 can receive aggregations of indicator values. Alternatively, the benchmark central software 502 can disable the benchmark feature in the customer instance 504 by uninstalling the benchmark feature from the customer instance 504.

In some implementations, all or a portion of the instance data 510 can be synced to the benchmark central software 502. For example, the credentials for the customer instance 504 can be synced with the central instance 500 responsive to the customer instance 504 being provisioned, such as on a server at a datacenter (e.g., the datacenter 108 shown in FIG. 1). For example, the benchmark central software 502 can use the credentials to verify that the customer instance 504 is permitted to use a benchmark feature to aggregate indicator values and receive all or a portion of the global indicator values 514. The instance data 510 can be synced to the benchmark central software 502 on a scheduled basis (e.g., once per month, once per six months, etc.). Alternatively, the instance data 510 can be synced to the benchmark central software 502 responsive to a command, such as a ReST API call.

Figure 6:
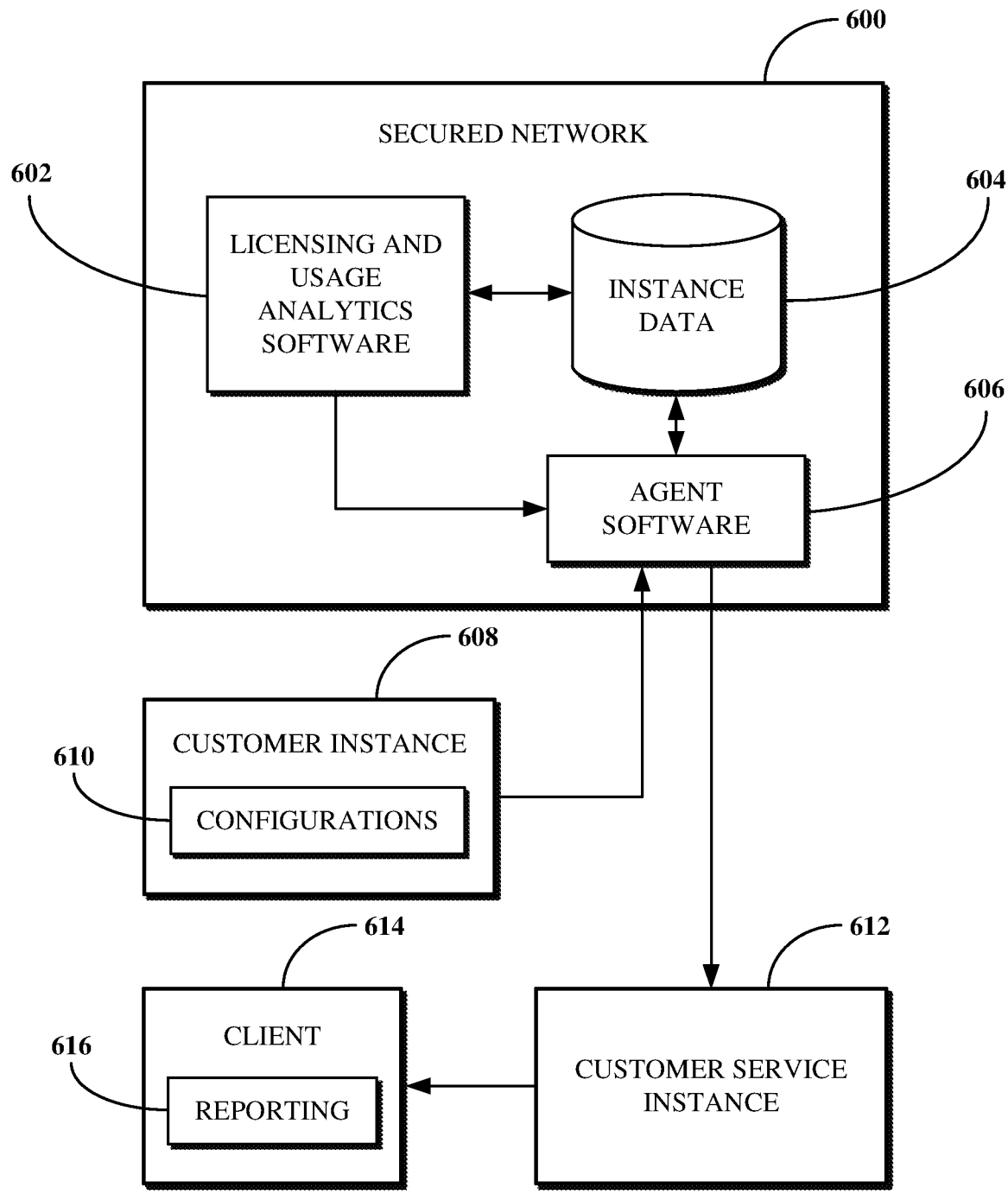
FIG. 6 is a block diagram of an example of a secured network for processing and aggregating indicator values.

FIG. 6 is a block diagram of an example of a secured network 600 for processing and aggregating indicator values. The secured network 600 can include benchmark feature functionality, such as functionality of one or more of a benchmark client software (e.g., the benchmark client software 410 shown in FIG. 4), a benchmark central software (e.g., the benchmark central software 502 shown in FIG. 5), or a benchmark common software (such as described above with respect to FIG. 4).

The secured network 600 includes licensing and usage analytics software 602, instance data 604, and agent software 606. The licensing and usage analytics software 602 has functionality for collecting performance analytics data (e.g., the source data 402 shown in FIG. 4) from a customer instance 608 and generating indicator values based on the collected information. For example, the licensing and usage analytics software 602 may include an incident alert management tool for monitoring incidents created or otherwise processed at the customer instance 608. In another example, the licensing and usage analytics software 602 may include a usage alert management tool for monitoring requests received at the customer instance 608, such as from clients in communication with the customer instance 608.

The licensing and usage analytics software 602 monitors performance of the customer instance 608 based on configurations 610 defined at the customer instance 608. The configurations 610 are used to select or otherwise indicate the indicator definitions used to generate indicator values. For example, the configurations 610 may include indicator definitions, such as the indicator definitions 406 shown in FIG. 4. The configurations 610 can be out-of-the-box configurations set by default by a computing provider operating the secured network 600. The configurations 610 can be selected by an administrator or other authorized user of the customer instance 608, for example, to focus on monitoring particular aspects of the customer instance 608.

The agent software 606 operates within the secured network 600 to permit communications between the customer instance 608 and components of the secured network 600 (e.g., by initiating a connection from within the secured network 600 to the customer instance 608, such as by using an HTTP protocol permitted by a firewall of the secured network 600). The agent software 606 can thus be used for operations directed by the licensing and usage analytics software 602 within the secured network 600, such as for collecting performance analytics data usable to generate indicator values from the customer instance 608.

The performance analytics data collected from the customer instance 608 can be synced to the licensing and usage analytics software 602 via the agent software 606. For example, performance analytics data collected over a time interval (e.g., one month, six months, etc.) at the customer instance 608 can be synced to the licensing and usage analytics software 602, such as by using a scheduled job of the customer instance 608, the licensing and usage analytics software 602, or other software or tools. In another example, the indicator data can be synced to the licensing and usage analytics software 602 responsive to a command, such as a ReST API call. A one-time sync can be performed between the customer instance 608 and the licensing and usage analytics software 602 before performance analytics data is collected, such as to obtain credentials for the customer instance 608 from an application store.

The licensing and usage analytics software 602 may include functionality of or similar to that of the performance analytics software 404 shown in FIG. 4 and/or the benchmark client software 410 shown in FIG. 4. For example, the licensing and usage analytics software 602 can generate indicator values (e.g., the indicator values 408 shown in FIG. 4) using the performance analytics data collected from the customer instance 608. The licensing and usage analytics software 602 can then generate aggregations of indicator values, such as by using benchmark indicator definitions corresponding to the indicator values generated for the customer instance 608.

The licensing and usage analytics software 602 may include functionality of or similar to that of the benchmark central software 502 shown in FIG. 5. For example, the licensing and usage analytics software 602 can process aggregations of indicator values using an outlier engine (e.g., of the pre-processing engine 508 shown in FIG. 5) to filter the aggregations of indicator values. The licensing and usage analytics software 602 can then generate global indicator values based on the filtered aggregations of indicator values and other aggregations of indicator values received from other customer instances. The licensing and usage analytics software 602 can generate the global indicator values according to characteristics of the customer instance 608 (and other customer instances from which aggregations of indicator values used to generate the global indicator values are received), such as by using the instance data 604. The instance data 604 can be the instance data 510 shown in FIG. 5.

The licensing and usage analytics software 602, via the agent software 606, can publish or otherwise upload one or more of the global indicator values to a customer service instance 612 (e.g., the customer service instance 304 shown in FIG. 3 or the customer service instance 512 shown in FIG.

5) accessible by a client 614. The client 614 can include functionality for reporting 616 the one or more global indicator values published to the customer service instance 612. The client 614 can be used by a user of the customer instance 608, such as to review the reported global indicator values. The customer service instance 612 can include a portal accessible by the client 614. The client 614 can access the portal to download and report the one or more global indicator values uploaded to the customer service instance 612.

Implementations of the secured network depicted in FIG. 6 can include additional, less, or combined functionality as compared to that described above, or functionality other than that described above, or combinations thereof. In some implementations, a separate usage and analytics tool (not shown) can collect the performance analytics data from the customer instance 608 and transmit it via the agent software 606 to the licensing and usage analytics software 602 for processing. For example, the separate usage and analytics tool can execute (or cause to be executed) a script within the customer instance 608 that collects the performance analytics data used to generate indicator values for the customer instance 608.

Figure 7:
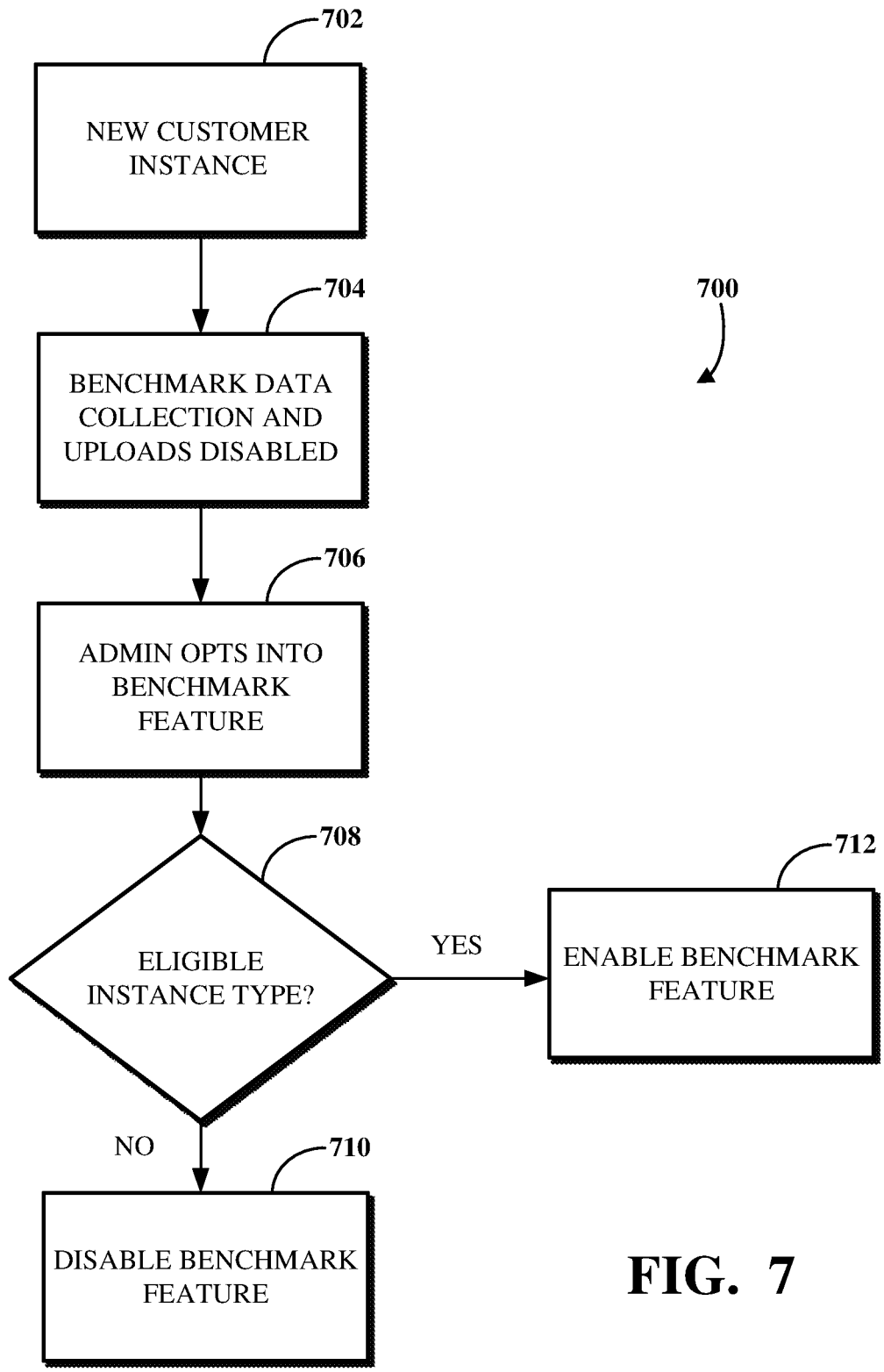
FIG. 7 is a flowchart illustrating an example of a technique for enabling or disabling a benchmark feature for a customer instance.

FIG. 7 is a flowchart illustrating an example of a technique 700 for enabling or disabling a benchmark feature for a customer instance. At 702, a new customer instance is instantiated, such as by using software executing at a server at a datacenter (e.g., implemented by the application node 114 and the database node 118 executing within the datacenter 108, as shown in FIG. 1). Upon instantiation of the new customer instance, the datacenter server executes a ReST API call to update the existence and credentials of the customer instance within a central instance. Communications between the customer instance and the central instance will use those credentials to authenticate the customer instance. At 704, by default, the benchmark feature is disabled on the customer instance. The benchmark feature collects data from certain customer instances for use in generating global indicator values, which can, for example, indicate trends in global performance across multiple customer instances.

At 706, an administrator or other authorized user of the customer instance can opt into the benchmark feature. Opting into the benchmark feature can include transmitting data indicating an intention to use the benchmark feature. For example, 706 can include transmitting a request for an installation of benchmark client software (e.g., the benchmark client software 410 shown in FIG. 4). In another example, such as where the benchmark client software is already installed at the customer instance, 706 can include a request to enable the benchmark client software, such as by granting access thereto for the administrator or like user of the customer instance.

At 708, a determination is made as to whether the customer instance is of an eligible instance type. If it is not of an eligible instance type, the benchmark feature can be (or remain, as applicable) disabled at 710. For example, if the customer instance is not a production instance, the benchmark feature may be disabled. An administrator or other authorized user of that customer instance may not be permitted to opt into the benchmark feature while that customer instance remains a non-production instance. However, other features, such as performance analytics software and like tools, may remain enabled for the non-production customer instance so that the administrator or other authorized user thereof can set up indicator definitions, sources, or the like in a development environment. For example, a non-production customer instance can use that data to create update sets for application software. Other types of customer instance may also not be eligible for the benchmark feature, for example, governmental instances, managed service provider instances, express instances, or the like.

However, if it is determined at 708 that the customer instance is of an eligible instance type, the benchmark feature is enabled for the customer instance at 712. Enabling the benchmark feature for the customer instance at 712 can include installing the benchmark client software at the customer instance, adding an identifier of the benchmark client software installed at the customer instance to a list of identifiers maintained by a central instance (e.g., where the identifiers of the list correspond to customer instances that are permitted to transmit aggregations of indicator values to the central instance), or the like, or combinations thereof.

Responsive to the benchmark feature being enabled for the customer instance, indicator values generated at the customer instance (e.g., using performance analytics software, such as the performance analytics software 404 shown in FIG. 4) can be used to generate aggregations of indicator values, such as by using the benchmark client software. The aggregations of indicator values can then be transmitted to the central instance for use in generating global indicator values. The generation of aggregations of indicator values and transmission thereof to the central instance is not available when the benchmark feature is disabled.

Figure 8:
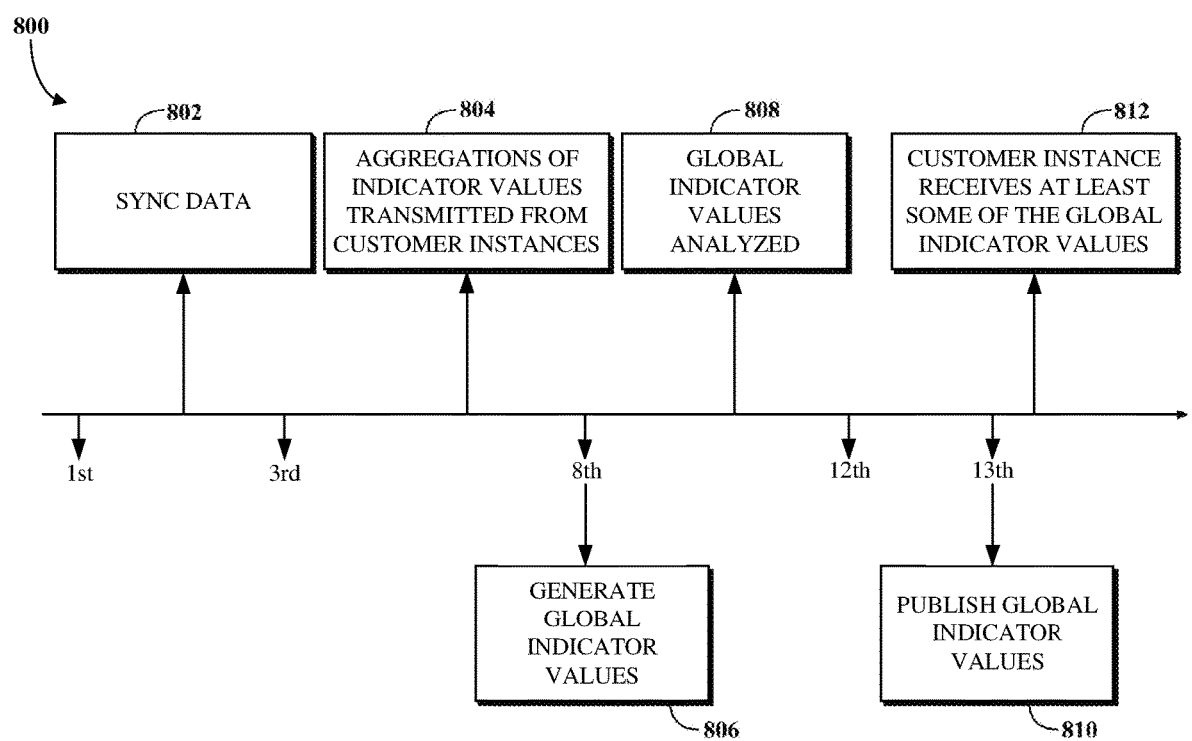
FIG. 8 is an illustration of an example timeline of operations relating to aggregating indicator values.

FIG. 8 is an illustration of an example timeline 800 of operations relating to aggregating indicator values. The units represented on the timeline 800 are dates, such as 24-hour days according to Coordinated Universal Time (UTC). However, the units represented on the timeline 800 could be units other than dates, such as based on the volume of aggregations of indicator values to be uploaded to the central instance, the number of customer instances that upload aggregations of indicator values, the processing time necessary for generating global indicator values based on the uploaded aggregations of indicator values, or for analyzing the generated global indicator values, other factors, or combinations thereof.

At 802, on a first UTC date, instance data (e.g., the instance data 510 shown in FIG. 5) is synced to the central instance, such as to benchmark central software executing at the central instance from a customer service instance in communication with the central instance. At 804, on a third UTC date, aggregations of indicator values are transmitted from customer instances to the central instance. The customer instance can be assigned a specific date and time at which it may transmit aggregations of indicator values to the central instance (e.g., via a scheduled job). For example, in order to limit the number of simultaneous transmissions to the central instance at any one time, the central instance can schedule uploads of aggregations of indicator values from individual ones of the customer instances at specific times over, for example, a twenty-four-hour period. In some implementations, an event queue can be used in place of a scheduled job.

At 806, on an eighth UTC date, global indicator values are generated based on the aggregations of indicator values received at the central instance from the customer instances. For example, 806 can include filtering the received aggregations of indicator values to remove outliers from the data, processing portions of the instance data synced at 802, and generating global indicator values by aggregating based on the filtered aggregations of indicator values according to the synced instance data.

At 808, at a time after the global indicator values are generated at 806, the global indicator values are analyzed, such as to determine trends in the global indicator values. The analysis can indicate performance trends amongst ones of the customer instances from which the aggregations of indicator values were received at 804. For example, a computing provider operating the central instance can analyze the data at 808 to determine whether any changes to the application software provided by the computing provider to its customers could result in global performance benefits for those customers. At 810, on a thirteenth UTC date, the global indicator values are published and made available for transmission to and/or retrieval by the customer instances.

At 812, a customer instance receives and/or retrieves at least some of the global indicator values generated at 806 from the central instance. The customer instance can be assigned a specific date and time at which it may receive and/or retrieve the respective global indicator values from the central instance. For example, in order to limit the number of requests for global indicator values from customer instances at any one time, the central instance can schedule downloads of respective portions of the global indicator values by individual ones of the customer instances at specific times over, for example, a five-day period. In some implementations, the customer instance may only download the global indicator values upon determining that those global indicator values differ from global indicator values previously downloaded from the central instance.

Figure 9A:
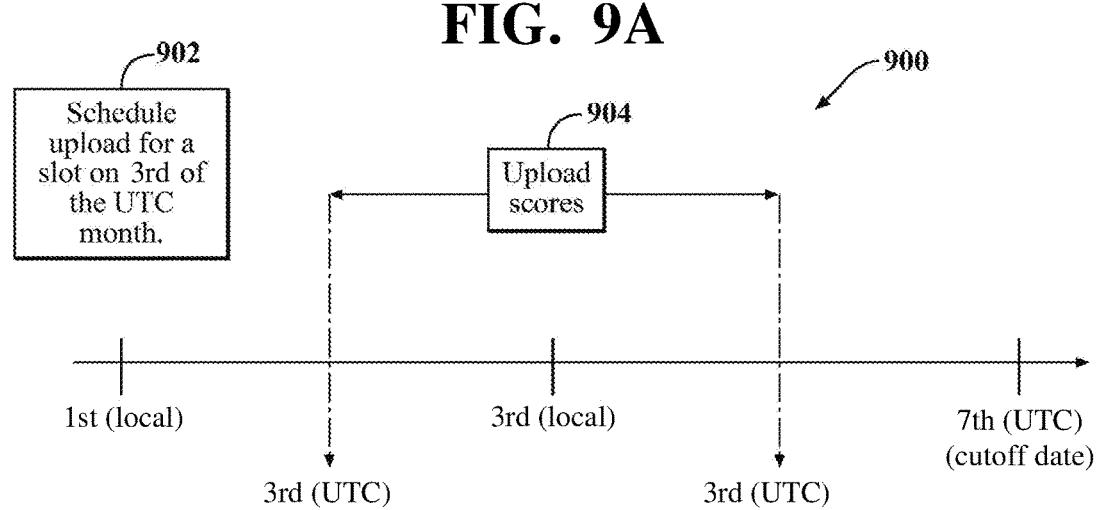
FIG. 9A is an illustration of an example timeline of the scheduled uploading of aggregations of indicator values from a customer instance to a central instance.

FIG. 9A is an illustration of an example timeline 900 of the scheduled uploading of aggregations of indicator values from a customer instance to a central instance. The timeline 900 represents a subset of the process for receiving aggregations of indicator values from customer instances, filtering the received aggregations of indicator values, generating global indicator values based on the filtered aggregations of indicator values, and transmitting portions of the global indicator values to respective ones of the customer instances. For example, the timeline 900 can represent events occurring with respect to a customer instance transmitting aggregations of indicator values shown at 804 in FIG. 8.

The timeline 900 limits the time available for the uploading of aggregations of indicator values from the customer instance to the central instance. The units represented on the timeline 900 are dates, such as twenty-four-hour days, and may span multiple time zones. For example, the timeline 900 can indicate events occurring at times relative to a local time zone (e.g., where "local" refers to the locality of the customer) and a UTC time zone. However, the units represented on the timeline 900 could be units other than days (e.g., hours, minutes, etc.), such as based on the volume of aggregations of indicator values to be uploaded to the central instance, the number of customer instances that upload aggregations of indicator values, other factors, or combinations thereof.

At the beginning of a first date, in a local time zone, (e.g., during a scheduled job operating at night local time) an upload of aggregations of indicator values is scheduled 902 for a slot on a third date of the UTC month. At a third date, in UTC, aggregations of indicator values are uploaded 904 from the customer instance to the central instance. The actual time at which the aggregations of indicator values are uploaded 904 occurs during the third date in UTC time. The aggregations of indicator values to be uploaded can represent the aggregations of indicator values generated for the prior month (e.g., a calendar month ending on a date prior to the first date shown in the timeline 900). The customer instance can upload the aggregations of indicator values to the central instance, for example, using a ReST API call for software executing at the central instance. If the upload is unsuccessful, the upload is retried at discrete time intervals (e.g., once every six hours) until a cutoff date. The cutoff date can be the seventh date of the UTC month. Other schemes for coordinating the timing of uploads can be used (e.g., a different time zone other than UTC can be used).

Figure 9B:
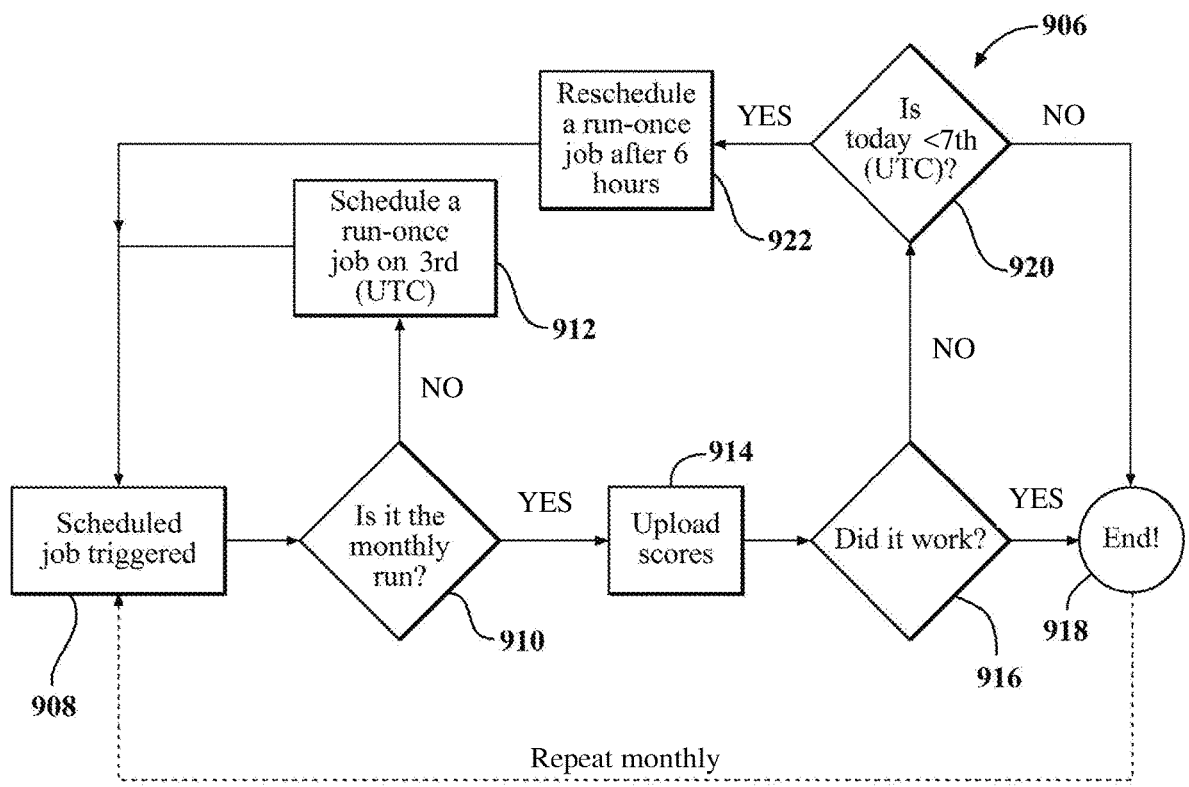
FIG. 9B is an illustration of an example technique for the scheduled uploading of aggregations of indicator values from a customer instance to a central instance.

FIG. 9B is an example technique 906 for the scheduled uploading of aggregations of indicator values from a customer instance to a central instance. The technique 906 depicts a flow of events of the timeline 900. At 908, the scheduled job for uploading the aggregations of indicator values from a customer instance to a central instance is triggered, such as on a third date of the UTC month. Prior to an upload, a determination is made at 910 as to whether the scheduled job is for the monthly upload of aggregations of indicator values to the central instance. If it is not the monthly upload, a run-once job is scheduled at 912 for the third date of the UTC month. If it is the monthly upload, the upload is processed at 914. A determination is made at 916 as to whether the upload was successful. If the upload was successful, the technique 906 terminates at 918. If the upload was not successful, a determination is made at 920 as to whether the then-current date is before the cutoff date for uploads to the central instance (e.g., the seventh date of the UTC month). If it is, the upload job is rescheduled at 922 for six hours from the prior attempt at 914. If it is not, however, the technique 906 terminates at 918. The technique 906 can repeat, such as monthly.

Figure 10:
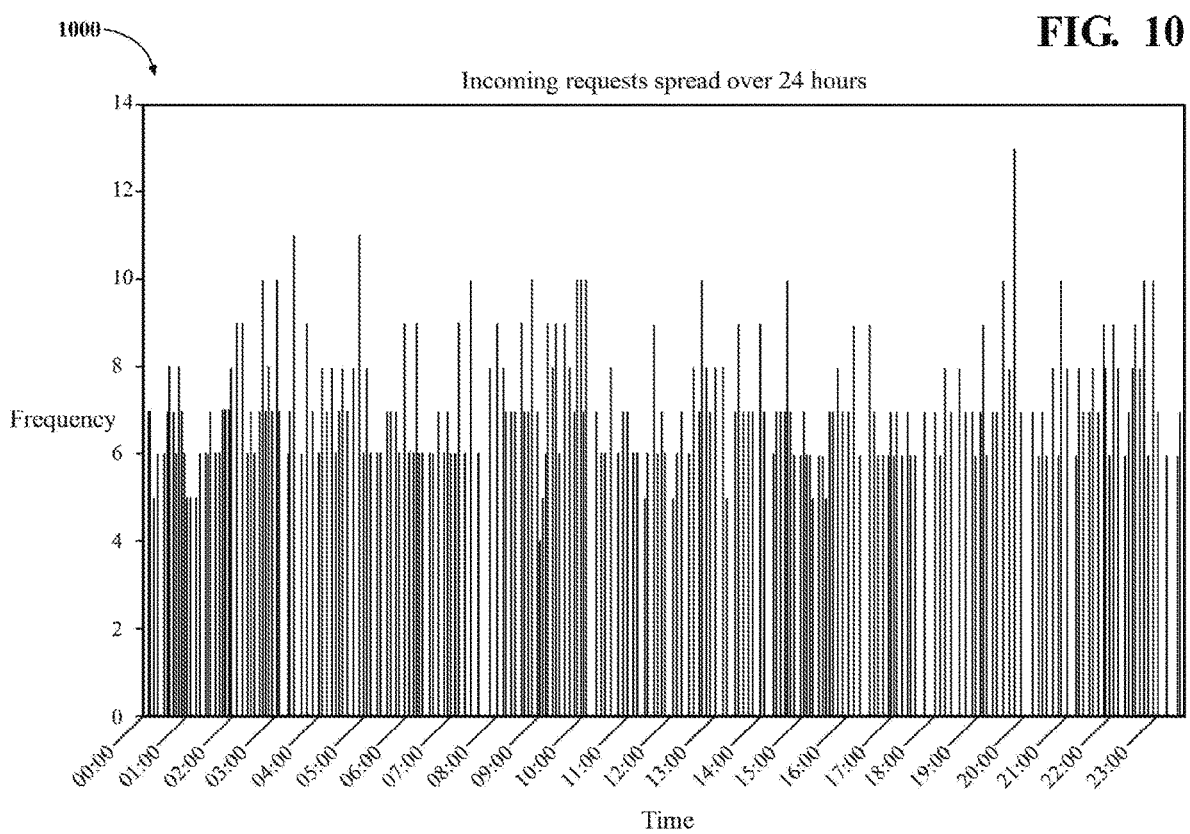
FIG. 10 is an illustration of an example of a graph showing a frequency of uploads to a central instance over time.

FIG. 10 is an illustration of an example of a graph 1000 showing a frequency of uploads to a central instance over time. The uploads from customer instances to the central instance are requested in one-hour buckets over a twenty-four-hour period. Given an example number of total uploads, certain intervals may have as few as four requests being made from customer instances to the central instances, whereas others may have over ten requests. The uploads requested as shown in the graph 1000 are requests to transmit aggregations of indicator values from ones of customer instances to a central instance that uses those aggregations of indicator values to generate global indicator values.

The process of uploading aggregations of indicator values from ones of the customer instances can be referred to as score collection. Score collection is performed monthly for all customer instances that have the benchmark feature enabled. However, the simultaneous transmission of aggregations of indicator values from each of these customer instances can cause processing, network, or other constraints or issues that may delay or prohibit the successful collection of the aggregations of indicator values.

As such, requests to upload aggregations of indicator values to the central instance are spanned over a twenty-four-hour period, as shown by the graph 1000. In some implementations, rather than dividing the twenty-four-hour period into twenty-four buckets (e.g., wherein each bucket represents one hour of the period), it can be divided into 1,399 buckets representing the number of minutes within the twenty-four-hour period. Other divisions of the time period may be used and other time periods may be used. The bucket assigned to a given customer instance is determined based on an identifier of the customer instance. The identifier of the customer instance may be defined by a datacenter at which the customer instance is instantiated, a server on which it is instantiated, or other criteria. A hashing methodology can be applied to the identifier of the customer instance to determine the bucket to which to assign the customer instance. In this way, the correct bucket for an instance may be determined in a distributed fashion (e.g., by the customer instances and not the central instance). Spanning the number of simultaneous uploads requested by the customer instances at any given time decreases the amount of strain placed on the central instance, such as by limiting the number of requests to be processed at any given time.

Another graph similar to the graph 1000 could show a frequency of downloads requested by the customer instances from which aggregations of indicator data were uploaded. For example, that other graph could show downloads requested by the customer instances in one-hour bucket intervals over a twenty-four-hour period, a five-day period, or some other period. As with the upload requests of the graph 1000, spanning the number of simultaneous downloads requested by the customer instances at any given time decreases the amount of strain placed on the central instance, such as by limiting the number of requests to be processed at any given time.

FIG. 11 is an illustration of examples of a table 1100 storing indicator definitions and a table 1110 storing benchmark indicator definitions. The indicator values generated at a customer instance (e.g., using the performance analytics software 404 shown in FIG. 4) can be generated using indicator definitions stored in a first layer of aggregation table 1100. For example, the indicator definitions stored in the first layer of aggregation table 1100 can be the indicator definitions 406 shown in FIG. 4. The first layer of aggregation table 1100 includes an identifier column 1102, an aggregation type column 1104, a description column 1106, and an interval column 1108. The identifiers stored in the identifier column 1102 are identifiers of indicator definitions used to generate indicator values. The aggregation types stored in the aggregation type column 1104 indicate a manner in which the indicator values are aggregated upon, for example, a total count, an average, or the like. The description stored in the description column 1106 identifies the indicator that is being measured (e.g., total incidents opened, high priority incidents opened, etc.). The interval stored in the interval column 1108 indicates a time interval for generating the indicator values, for example, daily.

The benchmark indicator definitions used for generating aggregations of indicator values at a customer instance (e.g., by aggregating upon the indicator values stored in the first layer of aggregation table 1100, such as by using the benchmark client software 410 shown in FIG. 4) can be stored in a second layer of aggregation table 1110. For example, the benchmark indicator definitions stored in the second layer of aggregation table 1110 can be the benchmark indicator definitions 418 shown in FIG. 4. The second layer of aggregation table 1110 includes an identifier column 1112, an aggregation type column 1114, a description column 1116, and an interval column 1118. The identifiers stored in the identifier column 1112 are identifiers of benchmark indicator definitions used to generate aggregations of indicator values. The aggregation types stored in the aggregation type column 1114 indicate a manner in which the indicator values are aggregated upon, for example, a percentage, an average, or the like. The description stored in the description column 1116 identifies the different indicator definitions that are being aggregated upon (e.g., total incidents that are high priority, incidents open more than one day, etc.). The interval stored in the interval column 1118 indicates a time interval for generating the aggregations of indicator values, for example, monthly.

The data stored within each of the first layer of aggregation table 1100 and the second layer of aggregation table 1110 can be generated by a customer instance (e.g., the customer instance 400 shown in FIG. 4), such as based on indicator definitions and benchmark indicator definitions available to the customer instance. Alternatively, the data stored in the first layer of aggregation table 1100 can be generated by a customer instance, such as based on indicator definitions available to the customer instance, and the data stored in the second layer of aggregation table 1110 can be generated by a central instance (e.g., the central instance 500 shown in FIG. 5), such as based on benchmark indicator definitions generated at the central instance.

The data stored in the second layer of aggregation table 1110 can be generated by the central instance using constituent data of a benchmark formula received from the customer instance (e.g., where the benchmark formula includes an equation for aggregating on two or more indicator definitions associated with the data stored in the first layer of aggregation table 1100). This may have the added benefit of reducing a number of outliers that need to be filtered (e.g., using the pre-processing engine 508 shown in FIG. 5), such as where software executing within the central instance (e.g., the benchmark central software 502 shown in FIG. 5) validates the benchmark formula prior to generating the data stored in the first layer of aggregation table 1100. This may result in a more appropriate data set usable for generating global indicator values.

Implementations of the first layer of aggregation table 1100 and/or the second layer of aggregation table 1110 depicted in FIG. 11 can include additional, less, or combined functionality as compared to that described above, or functionality other than that described above, or combinations thereof. In some implementations, the first layer of aggregation table 1100 can include an additional column for storing indicator values generated (e.g., by the performance analytics software) according to the data stored in the respective rows thereof. Similarly, the second layer aggregation table 1110 can include an additional column for storing indicator values generated (e.g., by the benchmark client software) according to the data stored in the respective rows thereof.

Figure 12:
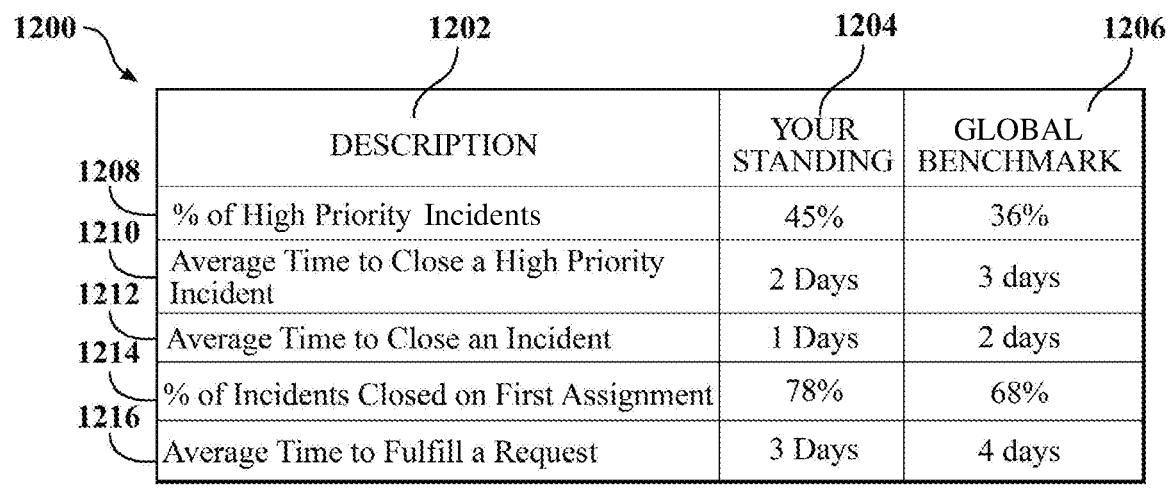
FIG. 12 is an illustration of an example of a chart for comparing aggregations of indicator values generated at a customer instance and corresponding global indicator values.

FIG. 12 is an illustration of an example of a chart 1200 for comparing aggregations of indicator values generated at a customer instance and corresponding global indicator values. For example, the chart 1200 may include or be included within a scorecard used to measure performance of the customer instance against the performance of other customer instances. The chart 1200 may, for example, be a chart included in a graphical user interface of the benchmark dashboard available to customers, such as by benchmark client software (e.g., the benchmark client software 410 shown in FIG. 4).

The chart 1200 includes a description column 1202, a your standing column 1204, and a global benchmark column 1206. The descriptions stored in the description column 1202 correspond to benchmark indicator definitions used by the central instance to generate the global indicator values (e.g., based on the descriptions of the aggregations of indicator values shown in the second layer of aggregation table 1110 shown in FIG. 11). The data stored in the your standing column 1204 reflects the values of the aggregation of indicator values transmitted from the customer instance and that correspond to the benchmark indicator definitions reflected in the description column 1202. The data stored in the global benchmark column 1206 reflects the values of the global indicator values that correspond to the benchmark indicator definitions of the aggregation of indicator values reflected in the description column 1202 and the your standing column 1204.

For example, an entry 1208 pertains to a percentage of incidents that are high priority incidents. The your standing column 1204 indicates that 45% of the incidents at the customer instance were high priority incidents, while the global benchmark column 1206 indicates that 36% of incidents at all customer instances involved in the benchmark feature were high priority incidents. In another example, an entry 1210 pertains to an average time to close a high priority incident. The your standing column 1204 indicates that the average time at the customer instance is two days, while the global benchmark column 1206 indicates that the average time across all applicable customer instances is three days. Other examples are shown in the chart 1200 for entries 1212, 1214, and 1216. In some implementations, the values included in the chart 1200 can be displayed in different formats. For example, the aggregations of indicator values generated at a customer instance can be displayed as tiles. The tiles can be color coded according to how the aggregations of indicator values compare to respective global indicator values. For example, a first tile may show an average time to resolve an incident at the customer instance. If that average time is higher than the corresponding global indicator value, the first tile may be displayed in red (e.g., to indicate that the customer is slower than the global average time for resolving incidents). However, if the average time shown in the first tile is lower than the corresponding global indicator value, the first tile may be displayed in green.

Figure 13A:
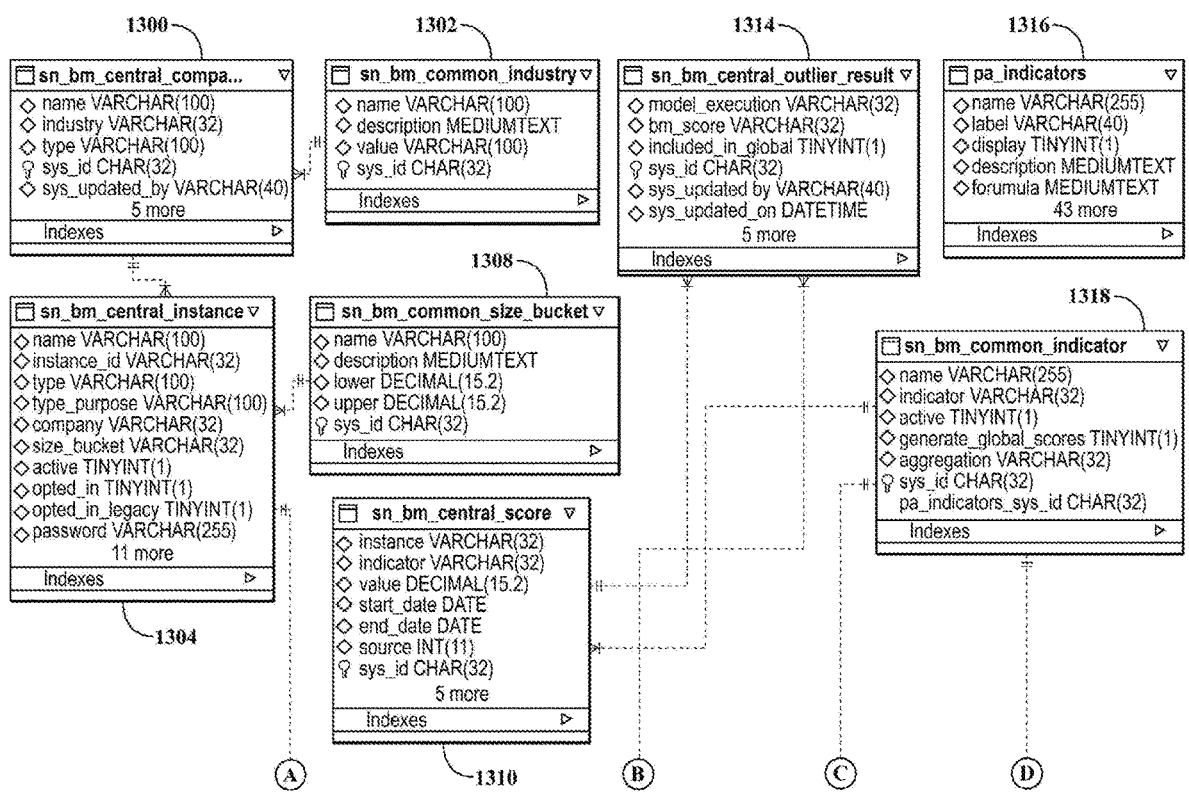
FIGS. 13A and 13B are diagrams of an example data model of a central instance.
Figure 13B:
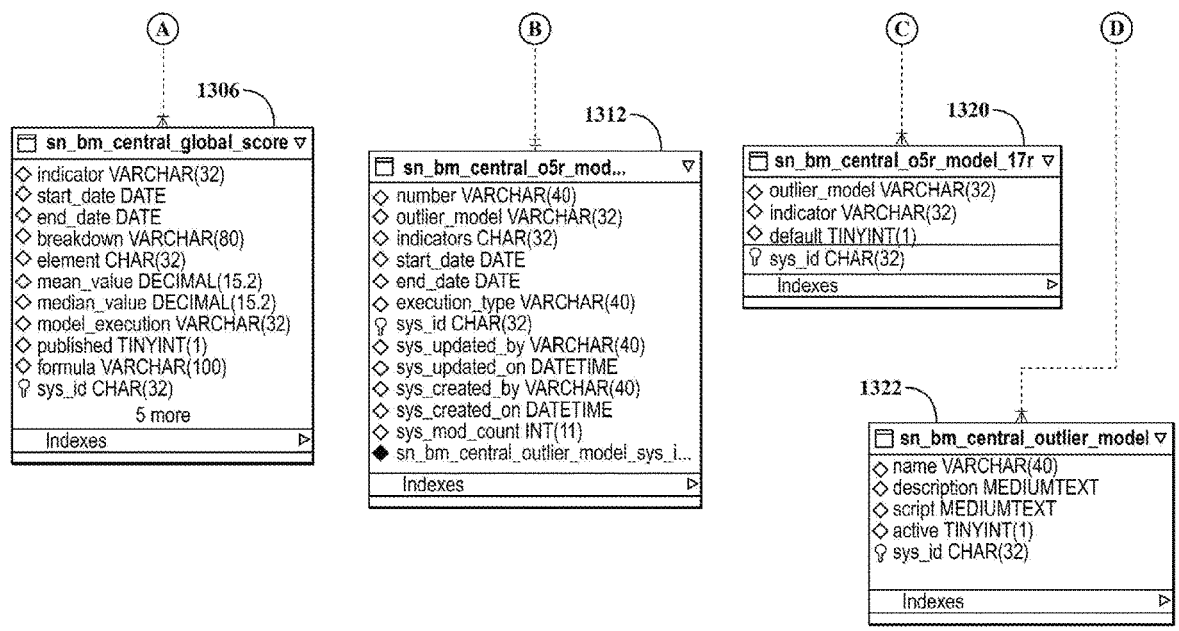
Figure 14:
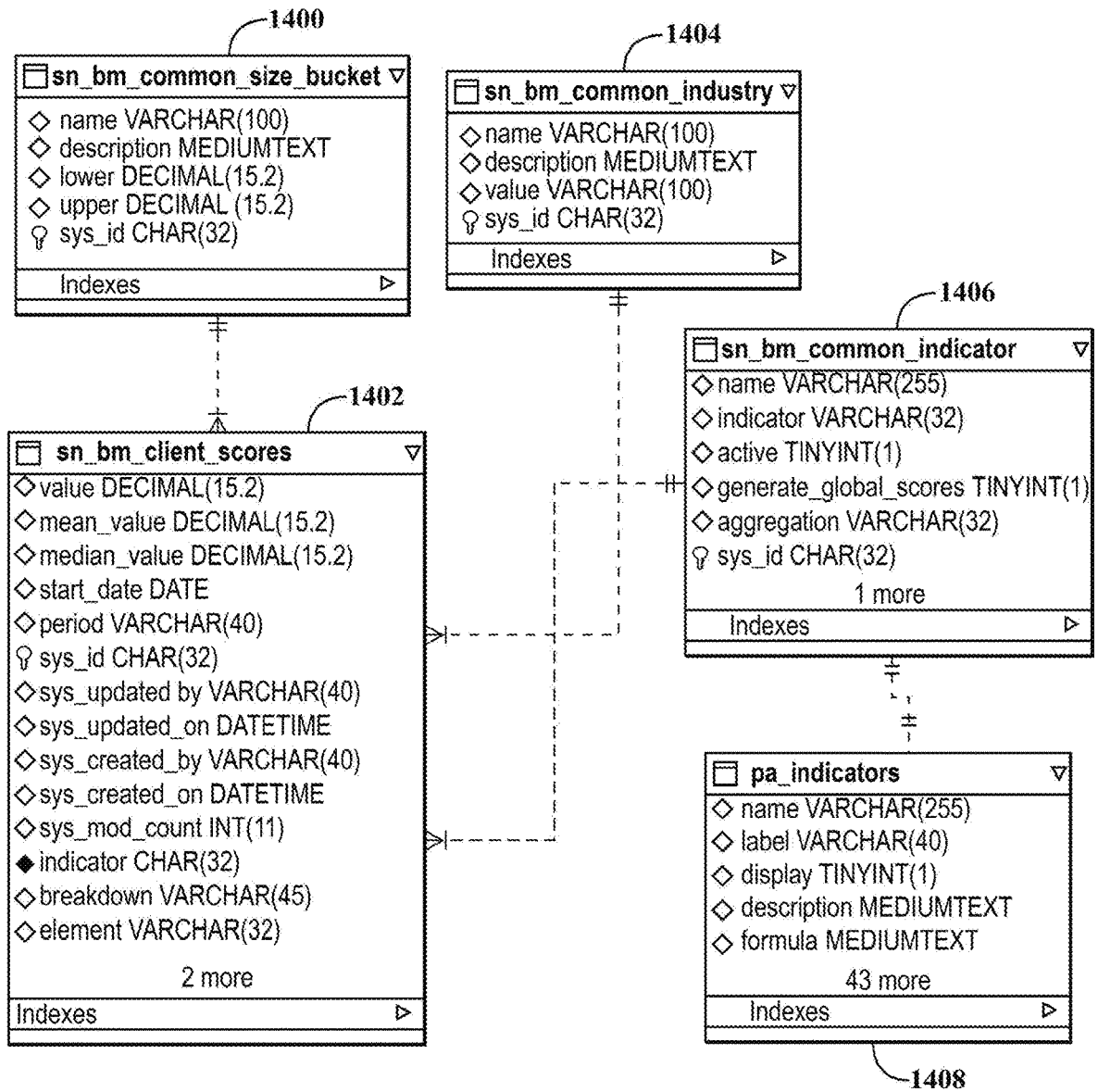
FIG. 14 is a diagram of an example data model of a customer instance.

FIGS. 13A and 13B are illustrations of an example data model of a central instance. The data model includes variables and indexes for storing customer instance company information 1300; customer instance industry information 1302; central instance information 1304; global indicator value information 1306; size bucket information 1308; indicator value information 1310; outlier model information 1312, 1320, 1322; outlier result information 1314; and indicators 1316, 1318. FIG. 14 is a diagram of an example data model of a customer instance. The data model includes variables and indexes for size bucket information 1400 (which may, for example, be the size bucket information 1308 shown in FIG. 13A); customer instance indicator value information 1402; customer instance industry information 1404; and indicators 1406, 1408.

Figure 15:
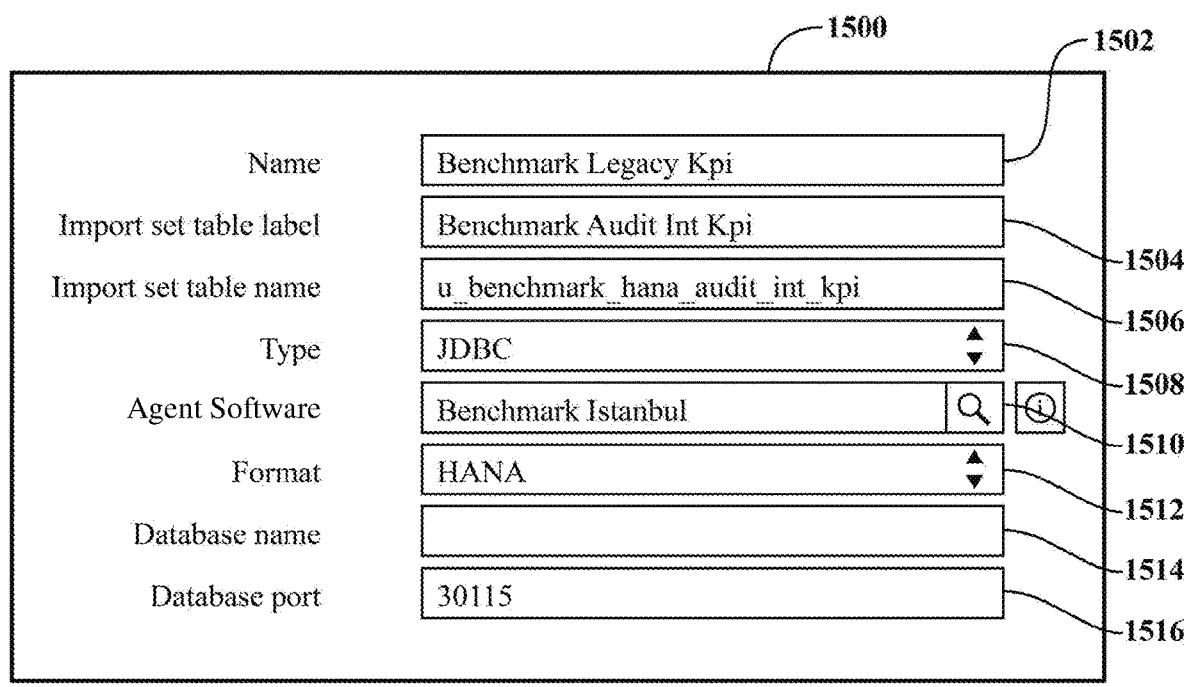
FIG. 15 is an illustration of an example of a form for configuring agent software for relaying aggregations of indicator values between a customer instance and a central instance.

FIG. 15 is an illustration of an example of a form 1500 for configuring agent software for relaying aggregations of indicator values between a customer instance and a central instance. For example, the agent software configured using the form 1500 can be the agent software 606 shown in FIG. 6. The form includes fields 1502, 1504, 1506, 1508, 1510, 1512, 1514, and 1516 for receiving input for configuring the agent software. The form can be included within a graphical user interface available using a customer instance, a central instance, or another instance having access to benchmark feature functionality.

A name of the configuration is entered in the field 1502. An import set table label is entered in the field 1504. A name of the import set table is entered in the field 1506. An agent software type is entered in the field 1508. For example, a Java Database Connectivity (JDBC) driver can be selected from drop-down menu to configure the agent software type. An available agent software installed in the customer network can be selected within the field 1510. For example, search functionality can be implemented to identify one or more installations of agent within the customer network so that one of those identified installations of agent software can be selected. A format of the agent software is entered in the field 1512. A database name is entered in the field 1514. A database port is entered in the field 1516.

In some implementations, configuring the agent software can include creating a user for the agent software. For example, another field of the form 1500 can receive input for the user. A role of the agent software can be added to the user to authorize the user to use the agent software. This would be to set up a connection with the agent software when it connects to a customer instance or other instance of software. In some implementations, configuring the agent software can include entering a data source for syncing data (e.g., instance data) to the agent software. In some implementations, configuring the agent software can include identifying a transform map for processing data stored in a staging table or other data store for receiving aggregations of indicator values, global indicator values, or the like, or combinations thereof.

FIG. 16 is an illustration of an example of a form 1600 for configuring an application of a central instance to process aggregations of indicator values received from a customer instance. The form 1600 includes fields 1602, 1604, 1606, 1608, 1610, 1612, 1614, 1616, and 1620 for receiving input (e.g., from a client in communication with the central instance, such as the client 310 shown in FIG. 3) for configuring benchmark central software executing at the central instance (e.g., the benchmark central software 502 shown in FIG. 5). The field 1602 can receive a name of the software to be configured using the form 1600 (e.g., Benchmark Central). The field 1604 can receive a user name for an authorized user of the software. The field 1606 can receive a password for authenticating access by the authorized user with the user name entered in the field 1604.

The field 1608 can receive a name or other identifier of a server on which the benchmark central software will execute. The field 1610 can be used to select types of queries that will be processed using the benchmark central software (e.g., against ones of the aggregations of indicator values received from customer instances). The fields 1612 and 1614 respectively can receive a query timeout and connection timeout for the benchmark central software. The field 1616 includes database statements (e.g., queries) that can be used in connection with data received from or otherwise associated with the customer instances. A checkbox 1618 can be toggled to use a date time from a last run of the benchmark central software. The field 1620 can receive an entry point into the benchmark central software, such as a connection URL therefor.

Figure 17:
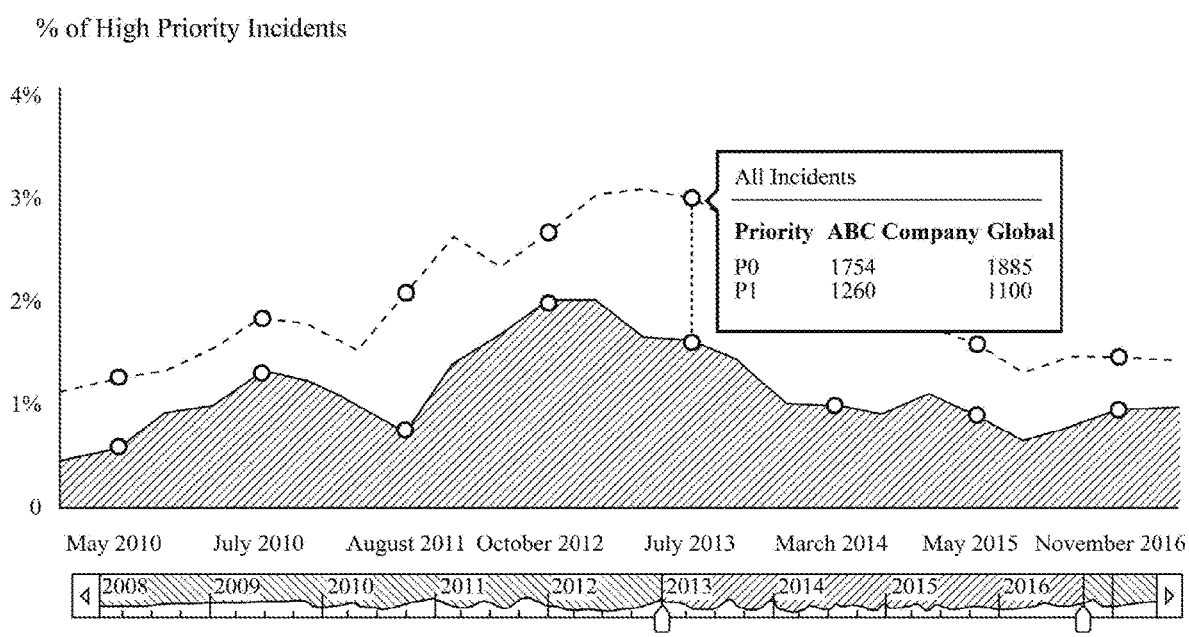
FIG. 17 is an illustration of an example of a graph showing a comparison between aggregations of indicator values generated at a customer instance and corresponding global indicator values generated at the central instance.

FIG. 17 is an illustration of an example of a graph 1700 showing a comparison between aggregations of indicator values generated at a customer instance and corresponding global indicator values generated at the central instance. The graph 1700 may, for example, be a graph included in a graphical user interface of the benchmark dashboard available to customers, such as by benchmark client software (e.g., the benchmark client software 410 shown in FIG. 4). The graph 1700 can illustrate changes in the aggregations of indicator values and/or the global indicator values over time (e.g., based on time series data published for download by or otherwise transmitted to the customer instance). For example, the graph 1700 depicts a percentage of incidents that are high priority incidents at the customer instance and globally across applicable customer instances from which data was received to generate the global indicator values. In some implementations, the software that renders the graph 1700 (e.g., the benchmark client software 410 shown in FIG. 4) may include functionality for filtering the values depicted in the graph. For example, the graph 1700 displayed to a current customer can be filtered so that the global values shown are those generated using data received from customer instances corresponding to an industry type of the current customer. Filtering functionality may also be available for other data visualizations.

FIG. 18 is an illustration of an example of a list of benchmark indicator definitions 1800 usable for aggregating indicator values at a customer instance. For example, the entries of the list of benchmark indicator definitions 1800 can be based on data stored within the second layer of aggregation table 1110 shown in FIG. 11. The list of benchmark indicator definitions 1800 can be included in a graphical user interface of benchmark client software (e.g., the benchmark client software 410 shown in FIG. 4) used to generate aggregations of indicator values for the customer instance. The list of benchmark indicator definitions 1800 includes a name section 1802, an active flag section 1804, an aggregation section 1806, a generate global scores flag section 1808, and a benchmark indicator definition section 1810.

The name stored in the name section 1802 is a description of the indicator definitions used to generate an aggregation of indicator values. The name stored in the name section 1802 can correspond to the benchmark indicator definition stored in the benchmark indicator definition section 1810. The active flag in the active flag section 1804 indicates whether the indicator definition is active, for example, such that it may be used to generate aggregations of indicator values. The aggregation in the aggregation section 1806 indicates an aggregation type and/or an interval for aggregation, for example, a monthly average, a monthly total count (e.g., sum), or the like. The generate global scores flag in the generate global scores flag section 1808 indicates whether global indicator values can be generated for the benchmark indicator definitions associated with the entries of the list (e.g., by the benchmark central software 502 shown in FIG. 5).

Figure 19:
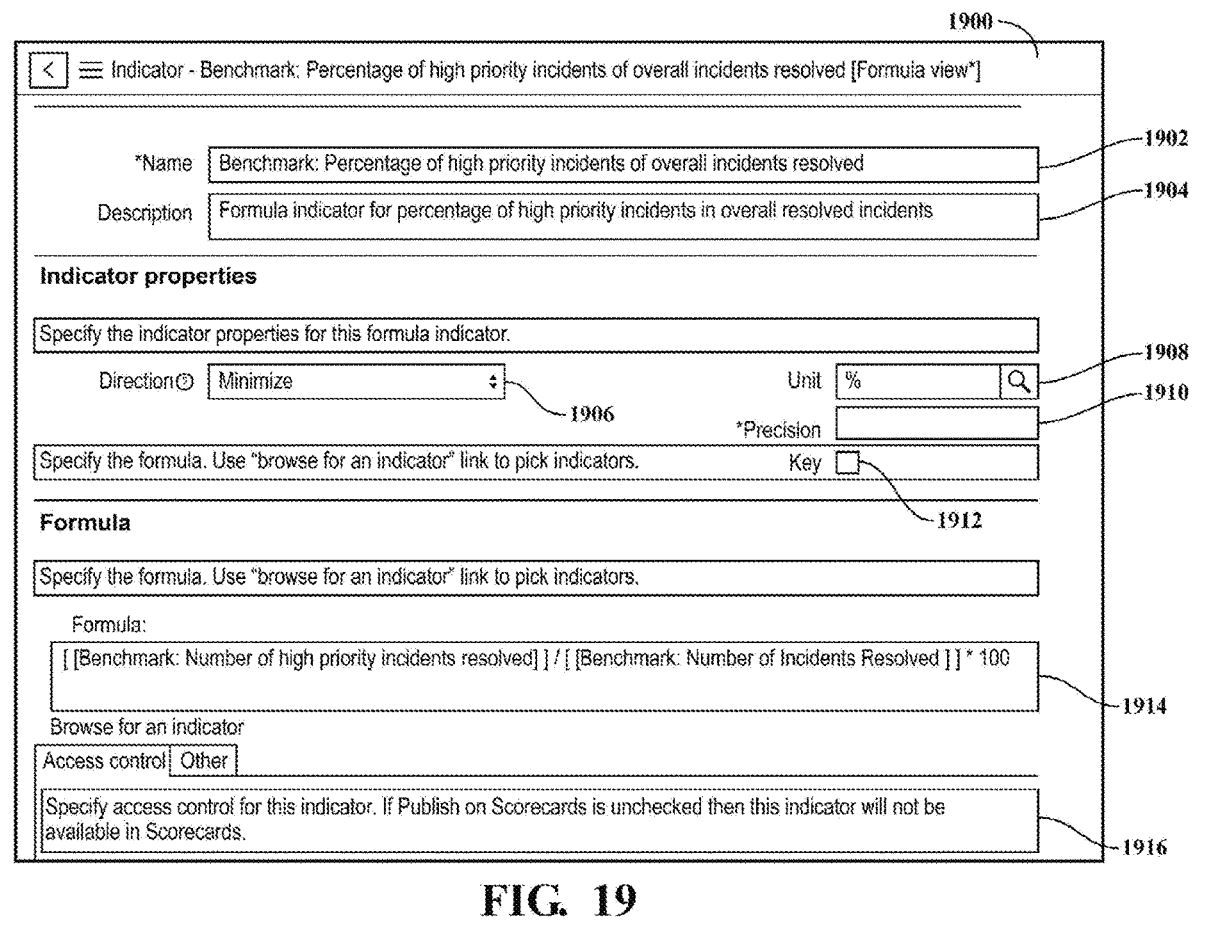

FIG. 19 is an illustration of an example of a form 1900 for defining a benchmark formula for aggregating indicator values at a customer instance. The form 1900 includes a name field 1902 for receiving a name or other identifier of the benchmark formula being defined using the form 1900. A description field 1904 can receive a description of the benchmark formula, such as a description of the indicator definitions included in the benchmark formula. For example, where the number of high priority incidents is a first indicator definition and the number of resolved incidents is a second indicator definition, the description can be for a percentage of high priority incidents in overall resolved incidents. One or more indicator properties for defining the benchmark formula may be input into the fields 1906, 1908, 1910, and 1912. The benchmark formula can be entered in a field 1914, such as by applying a mathematical operator to two or more indicator definitions. An access control rule can be specified in a field 1916.

Figure 20:
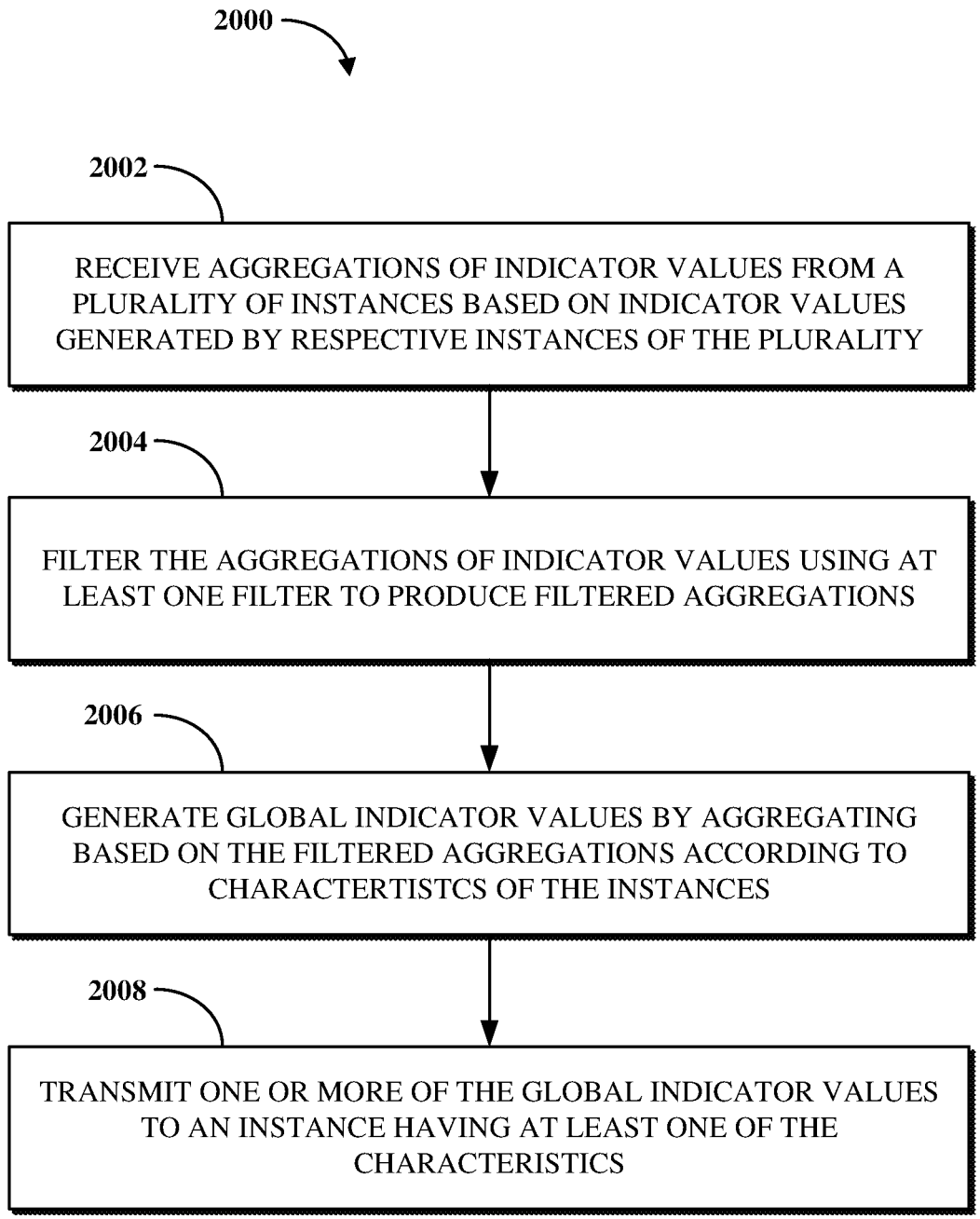
FIG. 20 is a flowchart illustrating an example of a technique for aggregating indicator values received from customer instances in a multi-instance computing environment.

FIG. 20 is a flowchart illustrating an example of a technique 2000 for aggregating indicator values received from customer instances in a multi-instance computing environment. The technique 2000 can be executed using computing devices, such as the systems, modules, and devices described with respect to FIGS. 1-19. The technique 2000 can be performed, for example, by executing a machine-readable program or other computer-executable instructions, such as instructions or programs described according to JavaScript, C, or other such instructions. The steps, or operations, of the technique 2000 or any other technique, method, process, or algorithm described in connection with the implementations disclosed herein can be implemented directly in hardware, firmware, software executed by hardware, circuitry, or a combination thereof.

In an implementation, the technique 2000 includes receiving aggregations of indicator values via 2002, filtering the aggregations of indicator values to produce filtered aggregations via 2004, generating global indicator values by aggregating the filtered aggregations via 2006, and transmitting one or more of the global indicator values to an instance of software via 2008.

At 2002, aggregations of indicator values are received from customer instances (e.g., the customer instance 504 shown in FIG. 5). The aggregations of indicator values are generated based on indicator values generated by respective customer instances of the customer instances. For example, performance analytics software executing at a customer instance (e.g., the performance analytics software 404 shown in FIG. 4) can apply indicator definitions to source data indicative of performance analytics data for the customer instance to generate the indicator values.

The indicator values can be aggregated, such as by using benchmark client software executing at the customer instance (e.g., the benchmark client software 410 shown in FIG. 4), based on benchmark indicator definitions for combining multiple indicator definitions into one aggregated indicator value. An aggregation of indicator values can be generated using an aggregation type different than aggregation types of the indicator values upon which it is based. For example, indicator values of the indicator definitions "number of high priority open incidents" and "number of open incidents" can have a "total" aggregation type, whereas an aggregation of indicator values of the benchmark indicator definition type "number of open incidents that are high priority" can have a "percentage" aggregation type.

The indicator values that are aggregated upon can be generated within a first layer measurement interval. For example, the performance analytics software can generate indicator values on a daily basis, wherein the first layer measurement interval is one day. The benchmark client software can then aggregate based on those indicator values over a second layer measurement interval to generate aggregations of interval values once a month. For example, the second layer measurement interval can be a one month period, where each day of that one month period is a first layer measurement interval.

The aggregations of indicator values generated at the customer instance are transmitted to a central instance for processing, for example, to be used to generate global indicator values. The central instance can receive aggregations of indicator values from each of the customer instances. The uploading of aggregations of indicator values from ones of the customer instances can be spanned over a time period, such as a twenty-four-hour period. For example, the central instance 412 can calculate a hash value for each customer instance, such as based on an identifier associated with the customer instance 400. A respective customer instance can then upload its aggregations of indicator values to the central instance 412 at a specified time during the twenty-four-hour period determined using the hash value.

The aggregations of indicator values received at 2002 are de-identified from the respective customer instances that generated them. For example, any information included within or otherwise associated with the aggregations of indicator values that indicates the source thereof can be discarded either before the aggregation of indicator values is transmitted (e.g., by the benchmark client software executing at the customer instance) or upon receipt from the customer instance (e.g., by the benchmark central software executing at the central instance).

At 2004, the aggregations of indicator values received at 2002 are filtered using at least one filter to produce filtered aggregations. The filtering at 2004 can be performed using a pre-processing engine of benchmark central software, such as the pre-processing engine 508 of the benchmark central software 502 shown in FIG. 5. The pre-processing engine can be or otherwise include an outlier engine for analyzing the aggregations of indicator values to identify trends, identify outliers in the trends, and discard the outliers from the aggregations of indicator values.

The filters used to produce the filtered aggregations can define thresholds for identifying outliers or discarding identified outliers. For example, a default filter can specify that values exceeding three standard deviations of a mean value of the aggregations of indicator values are outliers to be discarded. In another example, a default filter can specify that outliers that exceed a range of values permitted by the filter are to be discarded. The filters used to produce the filtered aggregations can be selected by default (e.g., according to out-of-the-box settings of the benchmark central software). Alternatively, those filters can be selected based on associations between those filters and indicator definitions used to generate the aggregations of indicator values.

At 2006, global indicator values are generated by aggregating based on the filtered aggregations according to at least one characteristic associated with at least some of the customer instances from which the aggregations of indicator values were received at 2002. The global indicator values can be generated from filtered aggregations (e.g., produced at 2004) that are greater than a minimum threshold. For example, the minimum threshold can refer to a minimum value for the filtered aggregations to exceed in order to be used to generate a global indicator value. In another example, the minimum threshold can refer to a minimum number of filtered aggregations that need to be used to generate a global indicator value.

Generating global indicator values for a set of filtered aggregations can include determining one of an average value for the set of filtered aggregations or a median value for the set of filtered aggregations. A set of filtered aggregations includes all of the filtered aggregations associated with a benchmark indicator definition. For example, a set of filtered aggregations may include multiple aggregations of indicator values related to a percentage of open incidents that are high priority (e.g., expressed using a benchmark formula as a benchmark indicator definition, for example, where the percentage equals a first value (e.g., the total number of open incidents that are high priority) divided by a second value (e.g., the total number of open incidents of any priority)). The multiple aggregations of indicator values included in a set of filtered aggregations are received from multiple customer instances. An average value can be determined or otherwise calculated by adding each of the aggregations of indicator values in the set and dividing that sum by the cardinality of the set. A median value thereof can be determined or otherwise calculated by ordering the aggregations of indicator values in the set and identifying an aggregation of indicator values located in the middle of the set.

As stated previously, the global indicator values are generated according to characteristics associated with the customer instances. The characteristics can be identified from instance data (e.g., the instance data 510 shown in FIG. 5), such as may be obtained from a customer service instance. The instance data can indicate information about the customers from which the aggregations of indicator values were received. One example of a characteristic associated with customer instances is an industry type. Another example of a characteristic associated with customer instances is a company size. Other examples are possible. The characteristics can be used to make sure that the generated global indicator values are representative of the customer instances from which the data used to generate same are received. As such, when an average value or median value is determined or otherwise calculated, the set of aggregations of indicator values used to determine or calculate same can be limited to those aggregations of indicator values corresponding to one or more characteristics.

At 2008, one or more of the global indicator values generated at 2006 is transmitted to a customer instance of the customer instances from which the aggregations of indicator values are received at 2002. The one or more of the global indicator values that are transmitted correspond to at least one characteristic used to generate the global indicator values at 2006, and the customer instance to which they are transmitted is associated with that at least one characteristic.

Transmitting the one or more global indicator values at 2008 can include publishing or otherwise uploading the global indicator values, such as to a portal or other component accessible by customer instances. For example, an administrator of a customer instance can access a portal associated with the customer instance to view and download global indicator values that correspond to the aggregations of indicator values transmitted from that customer instance. A customer instance of the customer instances can download corresponding global indicator values from the portal at a time determined using a hash value calculated by the central instance based on an identifier associated with the customer instance.

Although the technique 2000 is shown as a series of operations for clarity, implementations of the technique 2000 or any other method, technique, process, and/or algorithm described in connection with the implementations disclosed herein can be performed in various orders and/or concurrently. Additionally, operations in accordance with this disclosure can be performed with other operations not presented and described herein. Furthermore, one or more aspects of the systems and techniques described herein can be omitted.

In some implementations, receiving the aggregations of indicator values at 2002 includes receiving indicator values generated by respective ones of the customer instances and aggregating based on the received indicator values to generate the aggregations of indicator values. For example, the data received from the customer instances may be un-aggregated indicator values. In such cases, the central instance can include functionality for aggregating the received indicator values, such as according to benchmark indicator definitions maintained at the central instance.

In some implementations, a second set of the global indicator values generated at 2006 can be transmitted to a second customer instance, such as based on characteristics associated with that second customer instance and aggregations of indicator values transmitted from that second customer instance for generating global indicator values. The second set of global indicator values can be different from the one or more global indicator values transmitted to a first instance, such as at 2008. Because each of the customer instances may upload or otherwise transmit different types of aggregations of indicator values for use in generating the global indicator values, not all of the global indicator values generated at 2006 may be relevant to all of the customer instances.

An implementation includes means for receiving aggregations of indicator values from customer instances, wherein at least one of the aggregations of indicator values is generated by a respective customer instance of the customer instances based on indicator values generated by the respective customer instance; means for filtering the aggregations of indicator values using at least one filter to produce filtered aggregations; means for generating global indicator values by aggregating based on the filtered aggregations according to at least one characteristic associated with at least some of the customer instances, wherein each global indicator value is generated from one or more of the filtered aggregations that are greater than a minimum threshold; and means for transmitting one or more of the global indicator values to a customer instance of the customer instances having the at least one characteristic corresponding to the one or more global indicator values.

An implementation includes means for receiving indicator values generated by applying indicator definitions to source data; means for generating an aggregation of indicator values by aggregating based on the indicator values according to a benchmark indicator definition over a measurement interval; means for transmitting the aggregation of indicator values to a central instance; and means for receiving a global indicator value corresponding to the transmitted aggregation of indicator values from the central instance.

All or a portion of the implementations of the systems and techniques described herein can be implemented using a general-purpose computer/processor with a computer program that, when executed, carries out any of the respective techniques, algorithms, or instructions described herein. In addition, or alternatively, for example, a special-purpose computer/processor can be utilized, which can include specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array (e.g., a field-programmable gate array (FPGA)) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC), or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this disclosure, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this disclosure and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if each respective reference were individually and specifically indicated as being incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
   one or more hardware processors associated with a cloud service; and
   a non-transitory memory storing instructions that, when executed by the one or more hardware processors, cause the one or more hardware processors to perform operations comprising:
      receiving indicator values from a plurality of customer instances;
      filtering the indicator values to generate a filtered aggregation;
      calculating a global score for a characteristic associated with the plurality of customer instances based on the filtered aggregation, wherein the global score is anonymous with respect to which of the plurality of customer instances provided the indicator values;
      calculating a customer score for the characteristic associated with a particular customer instance of the plurality of customer instances; and
      generating a graphical user interface for the particular customer instance of the plurality of customer instances based on the global score and the customer score, the graphical user interface comprising a table comprising:
         a first field comprising a description for the characteristic;
         a second field comprising the customer score for the characteristic; and
         a third field comprising the global score for the characteristic.

2. The system of claim 1, wherein the operations comprise:
   transmitting the graphical user interface to the particular customer instance to present a comparison of the customer score for the characteristic associated with the particular customer instance to the global score for the characteristic associated with plurality of customer instances.

3. The system of claim 1, wherein the global score comprises data associated with the plurality of customer instances, and wherein the global score is generated from one or more of the filtered aggregation that are greater than a minimum threshold value.

4. The system of claim 1, wherein the table comprises a plurality of records corresponding to each of the first field, the second field, and the third field.

5. The system of claim 1, wherein filtering the indicator values comprises applying a filter that defines one or more threshold values used for identifying outliers, wherein the one or more hardware processors are configured to discard identified outliers of the indicator values to generate the filtered aggregation.

6. The system of claim 1, wherein the first field comprises alpha-numeric characters describing each record of a plurality of records corresponding to a plurality of global scores.

7. The system of claim 1, wherein the second field comprises a respective customer score for each record of a plurality of records corresponding to a plurality of global scores.

8. The system of claim 1, wherein the third field comprises a respective global score for each record of a plurality of records corresponding to a plurality of global scores.

9. The system of claim 1, wherein the indicator values are received from the particular customer instance at a time determined based on a hash value of an identifier associated with the particular customer instance.

10. The system of claim 1, wherein an identity associated with which of the plurality of customer instances contributed to the global score is not traceable by the particular customer instance.

11. A method, comprising:
receiving indicator values from a plurality of customer instances;
filtering the indicator values to generate a filtered aggregation;
calculating a global score for a characteristic associated with the plurality of customer instances based on the filtered aggregation, wherein the global score is anonymous with respect to which of the plurality of customer instances provided the indicator values;
calculating a customer score for the characteristic associated with a particular customer instance of the plurality of customer instances; and
generating a graphical user interface for the particular customer instance of the plurality of customer instances based on the global score and the customer score, the graphical user interface comprising a table comprising:
a first field comprising a description for the characteristic;
a second field comprising the customer score for the characteristic; and
a third field comprising the global score for the characteristic; and
transmitting the graphical user interface to the particular customer instance to present a comparison of the customer score for the characteristic associated with the particular customer instance to the global score for the characteristic associated with plurality of customer instances.

12. The method of claim 11, wherein the global score comprises data associated with the plurality of customer instances, and wherein the global score is generated from one or more of the filtered aggregation that are greater than a minimum threshold value.

13. The method of claim 11, wherein filtering the indicator values comprises applying a filter that defines one or more threshold values used for identifying outliers, wherein the method comprises discarding identified outliers of the indicator values to generate the filtered aggregation.

14. A non-transitory computer-readable medium comprising computer readable code, that when executed by one or more processors, causes the one or more processors to perform operations comprising:

receiving indicator values from a plurality of customer instances;
filtering the indicator values to generate a filtered aggregation;
calculating a global score for a characteristic associated with the plurality of customer instances based on the filtered aggregation, wherein the global score is anonymous with respect to which of the plurality of customer instances provided the indicator values;
calculating a customer score for the characteristic associated with a particular customer instance of the plurality of customer instances; and
generating a graphical user interface for the particular customer instance of the plurality of customer instances based on the global score and the customer score, the graphical user interface comprising a table comprising:
a first field comprising a description for the characteristic;
a second field comprising the customer score for the characteristic; and
a third field comprising the global score for the characteristic.

15. The non-transitory computer-readable medium of claim 14, wherein the operations comprise:
transmitting the graphical user interface to the particular customer instance to present a comparison of the customer score for the characteristic associated with the particular customer instance to the global score for the characteristic associated with plurality of customer instances.

16. The non-transitory computer-readable medium of claim 14, wherein the first field comprises alpha-numeric characters describing each record of a plurality of records corresponding to a plurality of global score.

17. The non-transitory computer-readable medium of claim 14, wherein the second field comprises a respective customer score for each record of a plurality of records corresponding to a plurality of global scores.

18. The non-transitory computer-readable medium of claim 14, wherein the third field comprises a respective global score for each record of a plurality of records corresponding to a plurality of global scores.

19. The non-transitory computer-readable medium of claim 14, wherein the indicator values are received from the particular customer instance at a time determined based on a hash value of an identifier associated with the particular customer instance.

20. The non-transitory computer-readable medium of claim 14, wherein an identity associated with which of the plurality of customer instances contributed to the global score is not traceable by the particular customer instance.

* * * * *